United States Patent
Matsunaga et al.

(10) Patent No.: US 9,049,324 B2
(45) Date of Patent: Jun. 2, 2015

(54) DATA PROCESSING DEVICE AND DATA PROCESSING METHOD FOR CREATING A FILE IN A SPECIFIED FORMAT OR OUTPUTTING A FILE IN A DETERMINED FORMAT

(75) Inventors: Takahisa Matsunaga, Hino (JP); Fumihito Akiyama, Yokohama (JP); Masahiro Ozawa, Hino (JP); Hiroshi Nogawa, Hachioji (JP); Yasufumi Aoyama, Hino (JP); Kunikazu Satou, Chofu (JP); Yasutaka Shimohara, Hachioji (JP); Tetsuren Ri, Hino (JP); Toyoshige Nounishi, Hachioji (JP)

(73) Assignee: KONICA MINOLTA BUSINESS TECHNOLOGIES, INC. (JP)

( * ) Notice: Subject to any disclaimer, the term of this patent is extended or adjusted under 35 U.S.C. 154(b) by 540 days.

(21) Appl. No.: 13/279,631

(22) Filed: Oct. 24, 2011

(65) Prior Publication Data
US 2012/0099158 A1 Apr. 26, 2012

(30) Foreign Application Priority Data
Oct. 25, 2010 (JP) ................................ 2010-238861
Dec. 1, 2010 (JP) ................................ 2010-268194

(51) Int. Cl.
*H04N 1/00* (2006.01)
*H04N 1/387* (2006.01)
(52) U.S. Cl.
CPC ......... *H04N 1/0044* (2013.01); *H04N 1/00453* (2013.01); *H04N 1/387* (2013.01); *H04N 2201/0068* (2013.01); *H04N 1/00225* (2013.01); *H04N 2201/0081* (2013.01); *H04N 2201/0094* (2013.01)

(58) Field of Classification Search
CPC .......................................................... H04N 1/00
USPC .................................................. 358/1.1–3.29
See application file for complete search history.

(56) References Cited

U.S. PATENT DOCUMENTS

2003/0090531 A1* 5/2003 Wong et al. ....................... 347/1
2005/0278624 A1* 12/2005 Nishikawa et al. ............ 715/517
2007/0133074 A1* 6/2007 Fabrice ......................... 358/537

(Continued)

FOREIGN PATENT DOCUMENTS

| JP | 07-152921 | A | 6/1995 | |
| JP | 2005-157905 | A | 6/2005 | |
| JP | 2005157905 | * | 6/2005 | ............... G06T 1/00 |
| JP | 2006-146486 | A | 6/2006 | |

OTHER PUBLICATIONS

First Office Action for Chinese Patent Application No. 201110330201.4, issued Jan. 6, 2014, with English translation.

(Continued)

*Primary Examiner* — Marcellus Augustin
(74) *Attorney, Agent, or Firm* — Cantor Colburn LLP

(57) ABSTRACT

A data processing device for incorporating one or more scanned data files generated by an image scanning device for storage into a file in a specified format (e.g. an Excel file) equipped with a plurality of display areas (e.g. spreadsheets), which is capable of receiving user's designation of one of the display areas to which each of the scanned data files is allocated to (S101), and modifying configuration data (e.g. part files) of the file so that each of the scanned data files is allocated to one of the display areas according to the user's designation (S112).

21 Claims, 35 Drawing Sheets

(56) References Cited

U.S. PATENT DOCUMENTS

| | | | |
|---|---|---|---|
| 2009/0225362 A1* | 9/2009 | Akiyama et al. | 358/1.15 |
| 2010/0100812 A1* | 4/2010 | Tamiya | 715/249 |
| 2010/0115391 A1* | 5/2010 | Engel et al. | 715/212 |
| 2011/0197117 A1* | 8/2011 | Williamson | 715/212 |

OTHER PUBLICATIONS

Notification of Reasons for Refusal for Japanese Patent Application No. 2010-238861, mailed on Feb. 18, 2014. English translation attached.

Yuji Tanaka, "Kantan! Scanner de denshi sukurappu (Simple! An Electronic Scrap with a Scanner)," Nikkei PC21, Japan: Nikkei Business Publications, Inc., Apr. 1, 2001, 6(7); pp. 40-53, and a partial English translation thereof.

Hiroshi Wakabayashi, 2010 Microsoft Office Word 2010 Perfect Master, Shuwa System Co., Ltd., Oct. 1, 2010, 1st. ed.: pp. 328-331 and 450-453, and a partial English translation thereof.

"Scanner Tukaikatano Tsubo Oshiemasu (Scanner: I Teach the Main Point of How to Use)," Nikkei PC21 beginners, Japan; Nikkei Business Publication, Inc., Jan. 13, 2005, 10: pp. 44, and a partial translation thereof.

Notification of Reason for Refusal corresponding to Japenese Patent Application No. 2010-238861, Date of Mailing: Oct. 7, 2014, with English translation.

* cited by examiner

FIG.7

```
<Default Extension="jpeg" ContentType="image/jpeg"/>
```

FIG.8

```
<Override PartName="/xl/drawings/drawing1.xml"
 ContentType="application/vnd.openxmlformats-officedocument.drawing+xml"/>
<Override PartName="/xl/drawings/drawing2.xml"
 ContentType="application/vnd.openxmlformats-officedocument.drawing+xml"/>
<Override PartName="/xl/drawings/drawing3.xml"
 ContentType="application/vnd.openxmlformats-officedocument.drawing+xml"/>
```

FIG.9

<dcterms:modified xsi:type="dcterms:W3CDTF">2010-05-31T08:51:25Z</dcterms:modified>

FIG.10

```
<?xml version="1.0" encoding="UTF-8" standalone="yes"?>
<Relationships xmlns="http://schemas.openxmlformats.org/package/2006/relationships">
<Relationship Id="rId1"
Type="http://schemas.openxmlformats.org/officeDocument/2006/relationships/image"
Target="../media/image1.jpeg"/>
</Relationships>
```

FIG.11

```
<?xml version="1.0" encoding="UTF-8" standalone="yes"?>
<Relationships xmlns="http://schemas.openxmlformats.org/package/2006/relationships">
<Relationship Id="rId1"
Type="http://schemas.openxmlformats.org/officeDocument/2006/relationships/image"
Target="../media/image2.jpeg"/>
</Relationships>
```

FIG.12

```
<?xml version="1.0" encoding="UTF-8" standalone="yes"?>
<Relationships xmlns="http://schemas.openxmlformats.org/package/2006/relationships">
<Relationship Id="rId1"
Type="http://schemas.openxmlformats.org/officeDocument/2006/relationships/image"
Target="../media/image3.jpeg"/>
</Relationships>
```

FIG.13

```xml
<?xml version="1.0" encoding="UTF-8" standalone="yes"?>
<xdr:wsDr
xmlns:xdr="http://schemas.openxmlformats.org/drawingml/2006/spreadsheetDrawing"
xmlns:a="http://schemas.openxmlformats.org/drawingml/2006/main">
 <xdr:twoCellAnchor>
  <xdr:from>
   <xdr:col>0</xdr:col>
   <xdr:colOff>0</xdr:colOff>
   <xdr:row>0</xdr:row>
   <xdr:rowOff>0</xdr:rowOff>
  </xdr:from>
  <xdr:to>
   <xdr:col>2</xdr:col>
   <xdr:colOff>19050</xdr:colOff>
   <xdr:row>5</xdr:row>
   <xdr:rowOff>47625</xdr:rowOff>
  </xdr:to>
  <xdr:pic>
   <xdr:nvPicPr>
    <xdr:cNvPr id="001" name="Picture 1"/>
    <xdr:cNvPicPr>
     <a:picLocks noChangeAspect="1" noChangeArrowheads="1"/>
    </xdr:cNvPicPr>
   </xdr:nvPicPr>
   <xdr:blipFill>
    <a:blip xmlns:r="http://schemas.openxmlformats.org/officeDocument/2006/relationships" r:embed="rId1" cstate="print"/>
    <a:srcRect/>
    <a:stretch>
     <a:fillRect/>
    </a:stretch>
   </xdr:blipFill>
   <xdr:spPr bwMode="auto">
    <a:xfrm>
     <a:off x="0" y="0"/>
     <a:ext cx="1390650" cy="904875"/>
    </a:xfrm>
    <a:prstGeom prst="rect">
     <a:avLst/>
    </a:prstGeom>
    <a:noFill/>
    <a:ln w="9525">
     <a:noFill/>
     <a:miter lim="800000"/>
     <a:headEnd/>
     <a:tailEnd/>
    </a:ln>
   </xdr:spPr>
  </xdr:pic>
  <xdr:clientData/>
 </xdr:twoCellAnchor>
</xdr:wsDr>
```

FIG.14

```
<Relationship Id="rId2"
Type="http://schemas.openxmlformats.org/officeDocument/2006/relationships/drawing"
Target="../drawings/drawing1.xml"/>
```

FIG.15

```
<Relationship Id="rId2"
Type="http://schemas.openxmlformats.org/officeDocument/2006/relationships/drawing"
Target="../drawings/drawing2.xml"/>
```

FIG.16

```
<Relationship Id="rId2"
Type="http://schemas.openxmlformats.org/officeDocument/2006/relationships/drawing"
Target="../drawings/drawing3.xml"/>
```

FIG.17

```
<?xml version="1.0" encoding="UTF-8" standalone="yes"?>
<worksheet xmlns="http://schemas.openxmlformats.org/spreadsheetml/2006/main"
xmlns:r="http://schemas.openxmlformats.org/officeDocument/2006/relationships">
 <dimension ref="A1"/>
 <sheetViews>
  <sheetView tabSelected="1" workbookViewId="0"/>
 </sheetViews>
 <sheetFormatPr defaultRowHeight="13.5"/>
 <sheetData/>
 <phoneticPr fontId="1"/>
 <pageMargins left="0.7" right="0.7" top="0.75" bottom="0.75" header="0.3" footer="0.3"/>
 <pageSetup paperSize="9" orientation="portrait" horizontalDpi="300" verticalDpi="300"
r:id="rId1"/>
 <drawing r:id="rId2"/>
</worksheet>
```

Prior Art

FIG.20
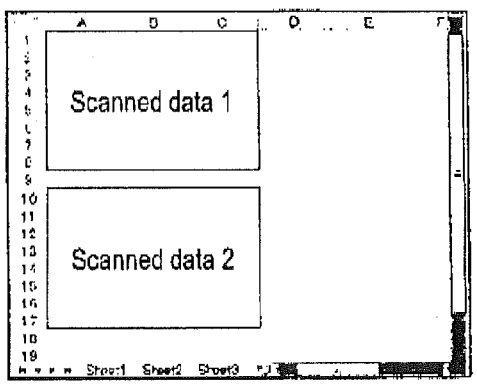 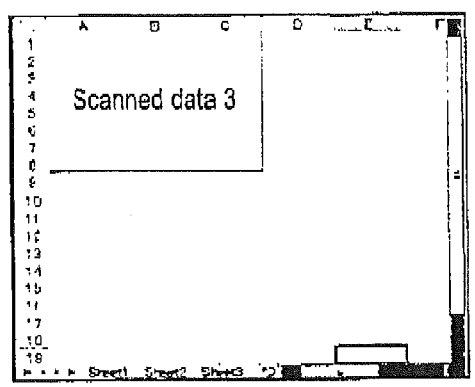

FIG.31

```
[Content_Types].xml
<?xml version="1.0" encoding="UTF-8" standalone="yes"?>
- <Types xmlns="http://schemas.openxmlformats.org/package/2006/content-types">
  <Default Extension="rels" ContentType="application/vnd.openxmlformats-package.relationships+xml" />
  <Default Extension="xml" ContentType="application/xml" />
  <Default Extension="gif" ContentType="image/gif" />    ← Added portion 1
  <Override PartName="/ppt/presentation.xml" ContentType="application/vnd.openxmlformats-officedocument.presentationml.presentation.main+xml" />
  <Override PartName="/ppt/slideMasters/slideMaster1.xml" ContentType="application/vnd.openxmlformats-officedocument.presentationml.slideMaster+xml" />
  <Override PartName="/ppt/slides/slide1.xml" ContentType="application/vnd.openxmlformats-officedocument.presentationml.slide+xml" />
  <Override PartName="/ppt/notesMasters/notesMaster1.xml" ContentType="application/vnd.openxmlformats-officedocument.presentationml.notesMaster+xml" />
  <Override PartName="/ppt/presProps.xml" ContentType="application/vnd.openxmlformats-officedocument.presentationml.presProps+xml" />
  <Override PartName="/ppt/viewProps.xml" ContentType="application/vnd.openxmlformats-officedocument.presentationml.viewProps+xml" />
  <Override PartName="/ppt/theme/theme1.xml" ContentType="application/vnd.openxmlformats-officedocument.theme+xml" />
  <Override PartName="/ppt/tableStyles.xml" ContentType="application/vnd.openxmlformats-officedocument.presentationml.tableStyles+xml" />
  <Override PartName="/ppt/slideLayouts/slideLayout1.xml" ContentType="application/vnd.openxmlformats-officedocument.presentationml.slideLayout+xml" />
  <Override PartName="/ppt/theme/theme2.xml" ContentType="application/vnd.openxmlformats-officedocument.theme+xml" />
  <Override PartName="/ppt/notesSlides/notesSlide1.xml" ContentType="application/vnd.openxmlformats-officedocument.presentationml.notesSlide+xml" />
  <Override PartName="/docProps/core.xml" ContentType="application/vnd.openxmlformats-package.core-properties+xml" />
  <Override PartName="/docProps/app.xml" ContentType="application/vnd.openxmlformats-officedocument.extended-properties+xml" />
</Types>
```

FIG.32A

```
ppt¥notesSlides¥notesSlide1.xml
  <?xml version="1.0" encoding="UTF-8" standalone="yes" ?>
- <p:notes xmlns:a="http://schemas.openxmlformats.org/drawingml/ 2006/ main"
      xmlns:r="http://schemas.openxmlformats.org/officeDocument/2006/relationships"
      xmlns:p=http://schemas.openxmlformats.org/presentationml/2006/main">
- <p:cSld>
- <p:spTree>
- <p:nvGrpSpPr>
  <p:cNvPr id="1" name="" />
  <p:cNvGrpSpPr />
  <p:nvPr />
  </p:nvGrpSpPr>
- <p:grpSpPr>
- <a:xfrm>
  <a:off x="0" y="0" />
  <a:ext cx="0" cy="0" />
  <a:chOff x="0" y="0" />
  <a:chExt cx="0" cy="0" />
  </a:xfrm>
  </p:grpSpPr>
- <p:sp>
- <p:nvSpPr>
  <p:cNvPr id="2" name="slide image place holder1" />
- <p:cNvSpPr>
  <a:spLocks noGrp="1" noRot="1" noChangeAspect="1" />
  </p:cNvSpPr>
- <p:nvPr>
  <p:ph type="sldImg" />
  </p:nvPr>
  </p:nvSpPr>
  <p:spPr />
  </p:sp>
- <p:sp>
- <p:nvSpPr>
  < p:cNvPr id="3" name="note place holder2" />
- <p:cNvSpPr>
  <a:spLocks noGrp="1" />
  </p:cNvSpPr>
- <p:nvPr>
  <p:ph type="body" idx="1" />
  </p:nvPr>
  </p:nvSpPr>
  <p:spPr />
- <p:txBody>
  < a:bodyPr />
  < a:lstStyle />
```

FIG.32B

```
- <a:p>
  - <a:r>
    <a:rPr kumimoji="1" lang="ja-JP" altLang="en-US" smtClean="0" />    Text portion
    <a:t>Note</a:t>  ———— Text content
  </a:r>
  <a:endParaRPr kumimoji="1" lang="ja-JP" altLang="en-US" dirty="0" />
</a:p>
</p:txBody>
</p:sp>
- <p:sp>
- <p:nvSpPr>
  <p:cNvPr id="4" name ="" slide number place holder3 />
- <p:cNvSpPr>
  <a:spLocks noGrp="1" />
</p:cNvSpPr>
- <p:nvPr>
  <p:ph type="sldNum" sz="quarter" idx="10" />
</p:nvPr>
</p:nvSpPr>
<p:spPr />
- <p:txBody>
  <a:bodyPr />
  <a:lstStyle />
- <a:p>
  - <a:fld id="{B7A10235-5A1A-4993-AE6F-2EFDDDD97213}" type="slidenum">
    <a:rPr kumimoji="1" lang="ja-JP" altLang="en-US" smtClean="0" />
    <a:t>1 </a:t>
  </a:fld>
  <a:endParaRPr kumimoji="1" lang="ja-JP" altLang="en- US" />
</a:p>
</p:txBody>
</p:sp>
</p:spTree>
- < p:extLst>
- <p:ext uri="{BB962C8B-B14F-4D97-AF65-F5344CB8AC3E}">
  <p14:creationId xmlns:p14="http://schemas.microsoft.com/office/powerpoint/2010/main" val="3085986680" />
</p:ext>
</p:extLst>
</p:cSld>
- <p:clrMapOvr>
  <a:masterClrMapping />
</p:clrMapOvr>
</p:notes>
```

FIG.33A

```
ppt¥Slides¥Slide1.xml
  <?xml version="1.0" encoding="UTF-8" standalone="yes" ?>
- <p:sld xmlns:a="http://schemas.openxmlformats.org/drawingml/2006/main"
    xmlns:r="http://schemas.openxmlformats.org/officeDocument/2006/relationships"
    xmlns:p="http://schemas.openxmlformats.org/presentationml/2006/main">
- <p:cSld>
- <p:spTree>
- <p:nvGrpSpPr>
  <p:cNvPr id="1" name=""/>
  <p:cNvGrpSpPr />
  <p:nvPr />
  </p:nvGrpSpPr>
- <p:grpSpPr>
- <a:xfrm>
  <a:off x="0" y="0" />
  <a:ext cx="0" cy="0" />
  <a:chOff x="0" y="0" />
  <a:chExt cx="0" cy="0" />
  </a:xfrm>
  </p:grpSpPr>
```

Text portion:
```
- <p:sp>
- <p:nvSpPr>
  <p:cNvPr id="2" name=" text box1" />
  <p:cNvSpPr txBox="1" />
  <p:nvPr />
  </p:nvSpPr>
- <p:spPr>
- <a:xfrm>                        ← Position/size information
  <a:off x="899592" y="980728" />
  <a:ext cx="3600400" cy="369332" />
  </a:xfrm>
- <a:prstGeom prst="rect">
  <a:avLst />
  </a:prstGeom>
  <a:noFill />
  </p:spPr>
- <p:txBody>
- <a:bodyPr wrap="square" rtlCol="0">
  <a:spAutoFit />
  </a:bodyPr>
  <a:lstStyle />
- <a:p>
- <a:r>
  <a:rPr kumimoji="1" lang="ja-JP" altLang="en-US" dirty="0" smtClean="0" />
  <a:t>text</a:t>  ←── Text content
  </a:r>
  <a:endParaRPr kumimoji="1" lang="ja-JP" altLang="en-US" dirty="0" />
  </a:p>
  </p:txBody>
  </p:sp>
```

FIG.33B

```
- <p:pic>                                                                          Picture portion
 - <p:nvPicPr>
   <p:cNvPr id="1026" name="Picture 2" descr="C:¥Documents and Settings¥e10181¥desktop¥copy1.gif" />
 - <p:cNvPicPr>
   <a:picLocks noChangeAspect="1" noChangeArrowheads="1" />
   </p:cNvPicPr>
   <p:nvPr />
   </p:nvPicPr>
 - <p:blipFill>
   <a:blip r:embed="rId3"> ————— Relationship ID
 - <a:extLst>
 - <a:ext uri="{28A0092B-C50C-407E-A947-70E740481C1C}">
   <a14:useLocalDpi xmlns:a14="http://schemas.microsoft.com/office/drawing/2010/main" val="0" />
   </a:ext>
   </a:extLst>
   </a:blip>
   <a:srcRect />
 - <a:stretch>
   <a:fillRect />
   </a:stretch>
   </p:blipFill>
 - <p:spPr bwMode="auto">
 - <a:xfrm>                          ————— Position/size information
   <a:off x="6372200" y="2276872" />
   <a:ext cx="1162050" cy="1285875" />
   </a:xfrm>
 - <a:prstGeom prst="rect">
   <a:avLst />
   </a:prstGeom>
   <a:noFill />
 - <a:extLst>
 - <a:ext uri="{909E8E84-426E-40DD-AFC4-6F175D3DCCD1}">
 - <a14:hiddenFill xmlns:a14="http://schemas.microsoft.com/office/drawing/2010/main">
 - <a:solidFill>
   <a:srgbClr val="FFFFFF" />
   </a:solidFill>
   </a14:hiddenFill>
   </a:ext>
   </a:extLst>
   </p:spPr>
   </p:pic>
```

FIG.33C

```
- <p:sp>                                                                  Graphic portion
 - <p:nvSpPr>
    <p:cNvPr id="3" name="quadrate/rectangle2" />
    <p:cNvSpPr />
    <p:nvPr />
   </p:nvSpPr>
 - <p:spPr>
  - <a:xfrm>
     <a:off x="827584" y="4365104" />  ———— Position /size information
     <a:ext cx="3456384" cy="792088" />
    </a:xfrm>
  - <a:prstGeom prst="rect">
     <a:avLst />
    </a:prstGeom>
  - <a:gradFill>
  - </a:gsLst>
   - <a:gs pos="0">
      <a:srgbClr val="000000" />
     </a:gs>
   - <a:gs pos="39999">
      <a:srgbClr val="0A128C" />
     </a:gs>
   - <a:gs pos="70000">
      <a:srgbClr val="181CC7" />
     </a:gs>
   -</a:gs pos="88000">
      <a:srgbClr val="7005D4" />
     </a:gs>
   -<a:gs pos="100000">
      <a:srgbClr val="8C3D91" />
     </a:gs>
    </a:gsLst>
    <a:lin ang="5400000" scaled="0" />
   </a:gradFill>
  </p:spPr>
 - <p:style>
  - <a:lnRef idx="2">
   - <a:schemeClr val="accent1">
      <a:shade val="50000" />
     </a:schemeClr>
    </a:lnRef>
  - <a:fillRef idx="1">
     <a:schemeClr val="accent1" />
    </a:fillRef>
  - <a:effectRef idx="0">
     <a:schemeClr val="accent1" />
    </a:effectRef>
  - <a:fontRef idx="minor">
     <a:schemeClr val="lt1" />
    </a:fontRef>
   </p:style>
 - <p:txBody>
    <a:bodyPr rtlCol="0" anchor="ctr" />
    <a:lstStyle />
  - <a:p>
     <a:pPr algn="ctr" />
     <a:endParaRPr kumimoji="1" lang="ja-JP" altLang="en-US" />
    </a:p>
   </p:txBody>
  </p:sp>
 </p:spTree>
```

FIG.33D

```
- <p:extLst>
  - <p:ext uri="{BB962C8B-B14F-4D97-AF65-F5344CB8AC3E}">
    <p14:creationId xmlns:p14="http://schemas.microsoft.com/office/powerpoint/2010/main" val="1550475604" />
    </p:ext>
  </p:extLst>
  </p:cSld>
- <p:clrMapOvr>
  <a:masterClrMapping />
  </p:clrMapOvr>
- <p:timing>
- <p:tnLst>
- <p:par>
  <p:cTn id="1" dur="indefinite" restart="never" nodeType="tmRoot" />
  </p:par>
  </p:tnLst>
  </p:timing>
  </p:sld>
```

FIG.34 ppt¥Slides¥_rels¥Slide1.xml.rels
<?xml version="1.0" encoding="UTF-8" standalone="yes" ?>
- <Relationships xmlns="http://schemas.openxmlformats.org/package/2006/relationships">
  <Relationship Id="rId3" Type="http://schemas.openxmlformats.org/officeDocument/2006/relationships/image" Target="../media/image1.gif" /> ← Added portion 2
  <Relationship Id="rId2" Type="http://schemas.openxmlformats.org/officeDocument/2006/relationships/notesSlide" Target="../notesSlides/notesSlide1.xml" />
  <Relationship Id="rId1" Type="http://schemas.openxmlformats.org/officeDocument/2006/relationships/slideLayout" Target="../slideLayouts/slideLayout1.xml" />
</Relationships> ppt¥ppt¥media¥image1.gif image1.gif

DATA PROCESSING DEVICE AND DATA PROCESSING METHOD FOR CREATING A FILE IN A SPECIFIED FORMAT OR OUTPUTTING A FILE IN A DETERMINED FORMAT

CROSS-REFERENCE TO RELATED APPLICATION

This application is based on Japanese Patent Applications No. 2010-238861 filed on Oct. 25, 2010 and No. 2010-268194 filed on Dec. 1, 2010 the contents of which are incorporated herein by reference.

BACKGROUND

1. Technical Field

The present invention relates to a data processing device and a data processing method for retrieving image data such as scanned data for storage in a specified format.

2. Description of Related Arts

The multiple functions of recent scanners have increased user's freedom of specifying the saving format for scanned data generated by these scanners. For example, Japanese Patent Application Publication No. 2006-146486 discloses an MVP capable of dividing a document image into small objects such as texts, illustrations, photographs, and tables by means of vector-scanning, and storing them in an user's specified file format for each object type.

In this context, various efforts have been made for effective use of scanned data, most of recent scanners are provided with a function to retrieve scanned data in JPEG format for storage in a specified file format such as Microsoft Word (registered trademark) and Microsoft Excel (registered trademark). These scanners are capable of receiving user's designation of a file format for storage, but their data storage operation will only result in random relocation of the scanned data within the designated format file. For example, if Excel is designated as a storage file format, the entire scanned data will be stored into a single spreadsheet (See FIG. 18). Consequently, the user will inevitably go through relocation of the scanned data within the file if he/she intends to make its effective use, and this means that user's burden in retrieving scanned data for storage has not been reduced as much as desired.

SUMMARY

In order to achieve at least one of the objects mentioned above, the data processing device for incorporating one or more scanned data files generated by an image scanning device for storage into a file in a specified file format equipped with a plurality of display areas, which reflect one aspect of the present invention, comprises: a reception unit for receiving user's designation of one of said display areas to which each of said scanned data files is allocated; and a data modification unit for modifying configuration data of said file so that each of said scanned data files is allocated to one of said display areas according to said user's designation received by said reception unit.

The data processing device which reflects another aspect of the invention comprises: an acquisition unit for acquiring image data; a determination unit for determining whether or not image layout of said acquired image data matches with image layout of a predetermined template by comparing said acquired image data with template data area of said template in order to determine whether or not said acquired image data fits into said template data area; and a control unit for generating vector data from said image data, and controlling said data processing device so that said generated vector data is output in image layout of said template with which said determination unit determines that image layout of said acquired image data matches.

The objects, features, and characteristics of the present invention other than those set forth above will become apparent from the description given herein below with reference to preferred embodiments illustrated in the accompanying drawings.

BRIEF DESCRIPTION OF THE DRAWINGS

FIG. 7 is a schematic diagram showing the content of the configuration data (part file) of an Excel file after the modification by the PC according to the first embodiment.

FIG. 8 is a schematic diagram showing the content of the configuration data (part file) of an Excel file after the modification by the PC according to the first embodiment.

FIG. 9 is a schematic diagram showing the content of the configuration data (part file) of an Excel file after the modification by the PC according to the first embodiment.

FIG. 10 is a schematic diagram showing the content of the configuration data (part file) of an Excel file after the modification by the PC according to the first embodiment.

FIG. 11 is a schematic diagram showing the content of the configuration data (part file) of an Excel file after the modification by the PC according to the first embodiment.

FIG. 12 is a schematic diagram showing the content of the configuration data (part file) of an Excel file after the modification by the PC according to the first embodiment.

FIG. 13 is a schematic diagram showing the content of the configuration data (part file) of an Excel file after the modification by the PC according to the first embodiment.

FIG. 14 is a schematic diagram showing the content of the configuration data (part file) of an Excel file after the modification by the PC according to the first embodiment.

FIG. 15 is a schematic diagram showing the content of the configuration data (part file) of an Excel file after the modification by the PC according to the first embodiment.

FIG. 16 is a schematic diagram showing the content of the configuration data (part file) of the Excel file after the modification by the PC according to the first embodiment.

FIG. 17 is a schematic diagram showing the content of the configuration data (part file) of the Excel file after the modification by the PC according to the first embodiment.

FIG. 20 is a schematic diagram showing an Excel file into which scanned data has been incorporated by an image scanning system according to the first embodiment.

FIG. 31 is an schematic diagram showing the part file "[Content_Types].xml".

FIG. 32A is a schematic diagram showing the part file "ppt¥notesSlides¥notesSlide1.xml".

FIG. 325 is a schematic diagram showing the part file "ppt¥notesSlides¥notesSlide1.xml".

FIG. 33A is a schematic diagram showing the part file "ppt¥Slides¥Slide1.xml".

FIG. 33B is a schematic diagram showing the part file "ppt¥Slides¥Slide1.xml".

FIG. 33C is a schematic diagram showing the part file "ppt¥Slides¥Slide1.xml".

FIG. 33D is a schematic diagram showing the part file "ppt¥Slides¥Slide1.xml".

FIG. 34 is a schematic diagram showing the part file "ppt¥Slides¥_rels¥Slide1.xml.rels".

DETAILED DESCRIPTION

The embodiments of this invention will be described below with reference to the accompanying drawings.

Figure 1:
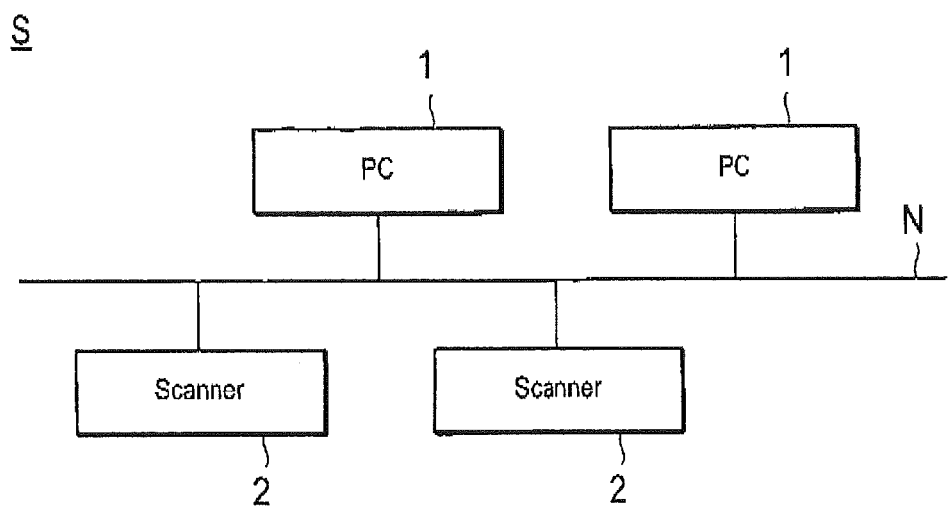
FIG. 1 is a block diagram showing the structure of an image scanning system according to the first embodiment of the present invention.

The first embodiment of the present invention will be described below. FIG. 1 is a block diagram showing the structure of an image scanning system S according to the present embodiment. As can be seen from FIG. 1, the image scanning system S contains a PC 1 which serves as a data processing device, and a scanner 2 which serves as an image scanning device, and both of them are connected with each other via a network N.

The network N is a LAN complying with a standard such as Ethernet (registered trademark), Token Ring, FDDI, etc., or a WAN with a plurality of LANs connected one another via a dedicated line. The PC 1 and the scanner 2 according to the present embodiment can also be connected directly instead of being connected via the network N. Type and number of equipments connected to the network N are not limited to the example shown in the figure.

Figure 2:
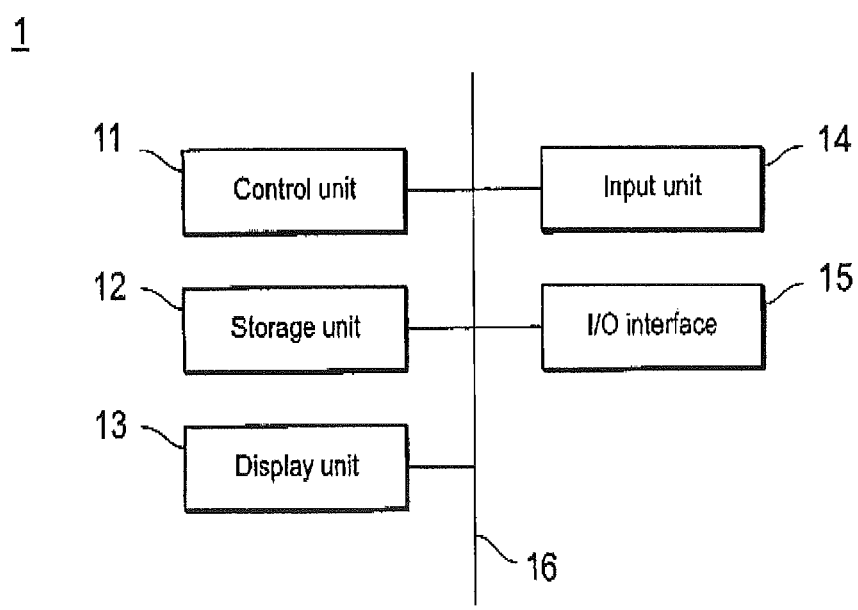
FIG. 2 is a block diagram showing the structure of a PC according to the first embodiment of the first embodiment.

The structures of the aforementioned equipments are described below in detail. FIG. 2 is a block diagram showing the structure of the PC 1 according to the present embodiment. As shown in FIG. 2, the PC 1 according to the present embodiment is equipped with a control unit 11, a storage unit 12, a display unit 13, an input unit 14, and an input/output interface 15, and they are connected via bus 16 for exchanging signals. Details of these components will be described below.

The control unit 11 is a CPU (Central Processing Unit) for controlling operations of each unit in accordance with control programs and executing various arithmetic processing. The storage unit 12 contains a ROM (Read Only Memory) for storing control programs of PC 1's basic functions and various parameters, a RAM (Random Access Memory) for temporarily storing various programs and data files to serve as a working area, a hard disk for storing an OS (i.e. Basic Software), various control program for the particular processing shown below, various parameters, etc.

The display unit 13 is a display device such as an LCD for displaying various information to user. The input unit 14 contains a keyboard, a mouse, etc., to be used for receiving various operational instructions from user. The input/output interface 15 is an interface for communication with other devices on the network N.

The PC 1 according to the present embodiment is equipped with various kinds of business software programs including a document preparation program such as Microsoft Word (registered trademark) and a spreadsheet program such as Microsoft Excel (registered trademark). In particular, the PC 1 supports Word and Excel files in the Office OPEN XML (OOXML) format. The PC 1 is provided with a scanner driver, which is a software product which can offer an user interface (UI) screen for setting operations of the scanner 2.

Figure 3:
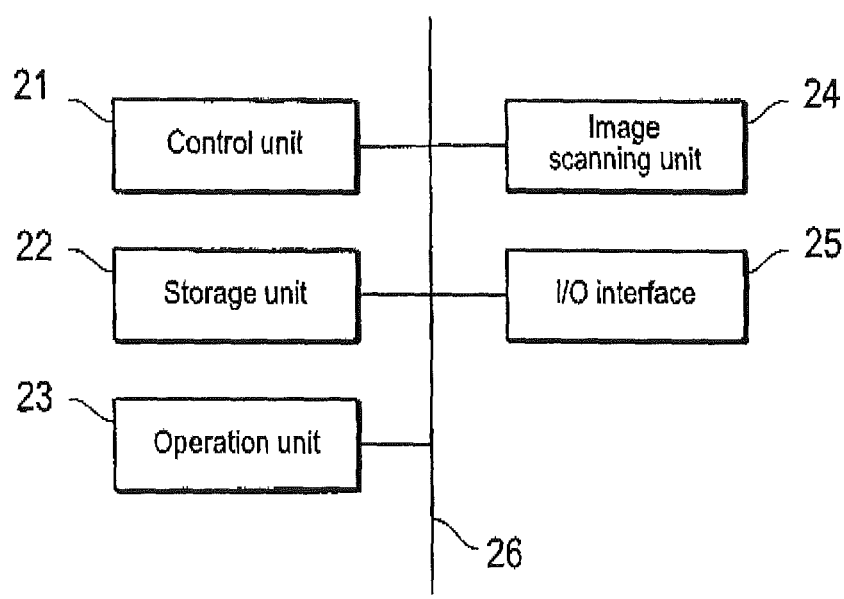
FIG. 3 is a block diagram showing the structure of a scanner according to the first embodiment.

FIG. 3 is a block diagram showing the structure of the scanner 2 according to the present embodiment. As shown in FIG. 3, the scanner 2 according to the present embodiment is equipped with a control unit 21, a storage unit 22, an operation unit 23, an image scanning unit 24, and an input/output interface 25, and they are connected via bus 26 for exchanging signals. Details of these components will be described below.

The control unit 21 is a CPU (Central Processing Unit) for controlling operations of each unit in accordance with control programs and executing various arithmetic processing. The storage unit 22 contains a ROM (Read Only Memory) for storing control programs of the basic functions of the scanner 2 and various parameters, a RAM (Random Access Memory) for temporarily storing programs and data files to serve as a working area, a hard disk for storing a program for controlling the particular processing of the scanner 2 and various parameters.

The operation unit 23 is an operation panel such as a LCD for displaying an UI screen for showing various information to user as well as receiving various operational instructions the user. The input/output interface 25 is an interface for communication with other devices on the network N.

The image scanner 24 has a function to irradiate either a document set on a certain scanning position on a platen, or a document transported to the same scanning position by an ADF (Auto Document Feeder) with a light source such as a fluorescent lamp, and to scan the reflected light from the document with light receiving elements such as CCD and CMOS image sensors to generate digital data of the document image. Such a series of operations is hereinafter referred to as "scanning operation". The digital data created by the scanning operation is hereinafter referred here as "scanned data" or "scanned data file".

In the image scanning system S with the aforementioned structure, the PC 1 can retrieve more than one scanned data file created by the scanner 2 into am Excel file in the OOXML format. More specifically, the PC 1 can receive user's designation of a spreadsheet (hereinafter also referred to as "sheet") as a storage destination of each scanned data file by means of the UI screen offered by the scanner driver, and store each scanned data file into user's designated sheet.

The Excel file in the COXML format contains a group of binary data files such as text data files in the XML (Extensible Markup Language) and image data files. Such a group is generally called as a package, and individual data files within a package are called as part files. The PC 1 according to the present embodiment can create an Excel file with user's desired structure by modifying the part files within the package accordingly. In particular, the PC 1 is capable of incorporating image data such as scanned data into an Excel file by modifying or adding the part files shown in Table 1.

TABLE 1

| Part file | Description |
| --- | --- |
| ¥[Content_Type].xml | This file shows a list of the content types of the part files within the package. |
| ¥docProps¥core.xml | This file shows document information of the Excel file (e.g. data and time of recent update). |
| ¥xl¥drawings ¥drawings1.xml | This file shows positional information of the image data to be incorporated into an Excel file. This file exists for each image data. |
| ¥xl¥drawing¥_rels ¥drawing1.xml.rels | This file shows relationship between the source part (i.e. "drawing1.xml") and its target resource. |
| ¥xl¥media¥image1.jpeg | This file contains the image data (in JPEG format) to be incorporated into an Excel file. |

While a newly created Excel file is equipped with three spread sheets, the system can also incorporate scanned data into additional sheets starting with the fourth sheet by modifying or adding the part files shown in Table 2.

TABLE 2

| Part file | Description |
| --- | --- |
| ¥[Content_Type].xml | This file shows a list of the content types of the part files within the package. |
| ¥docProps¥app.xml | This file shows application information of the Excel file as well as sheet information of the additional sheet. |
| ¥docProps¥core.xml | This file shows document information of the Excel file (e.g. time and date of recent update). |
| ¥xl¥workbook.xml | This file shows information on book structure of the Excel file. |
| ¥xl¥_rels ¥workbook.xml.rels | This file shows relationship between the source part (i.e. "workbook.xml") and its target resource. |
| ¥xl¥worksheets ¥sheet.xml | This file shows information on the sheet structure of the Excel file, This file exists for each image data. |
| ¥xl¥worksheets¥_rels ¥sheet.xml.rels | This file shows relationship between the source part (i.e. "sheet.xml") and its target resource. |

As can be seen from the above, the PC 1 according to the present embodiment is capable of incorporating each scanned data file for storage into user-designated sheet by modifying the relevant part files in the package of the Excel file. FIG. 20 illustrates an Excel file to be created by the PC 1 when "Sheet1" is designated as destination of the scanned data 1 and 2, and "Sheet2" is designated as destination of the scanned data 3.

Figure 4A:
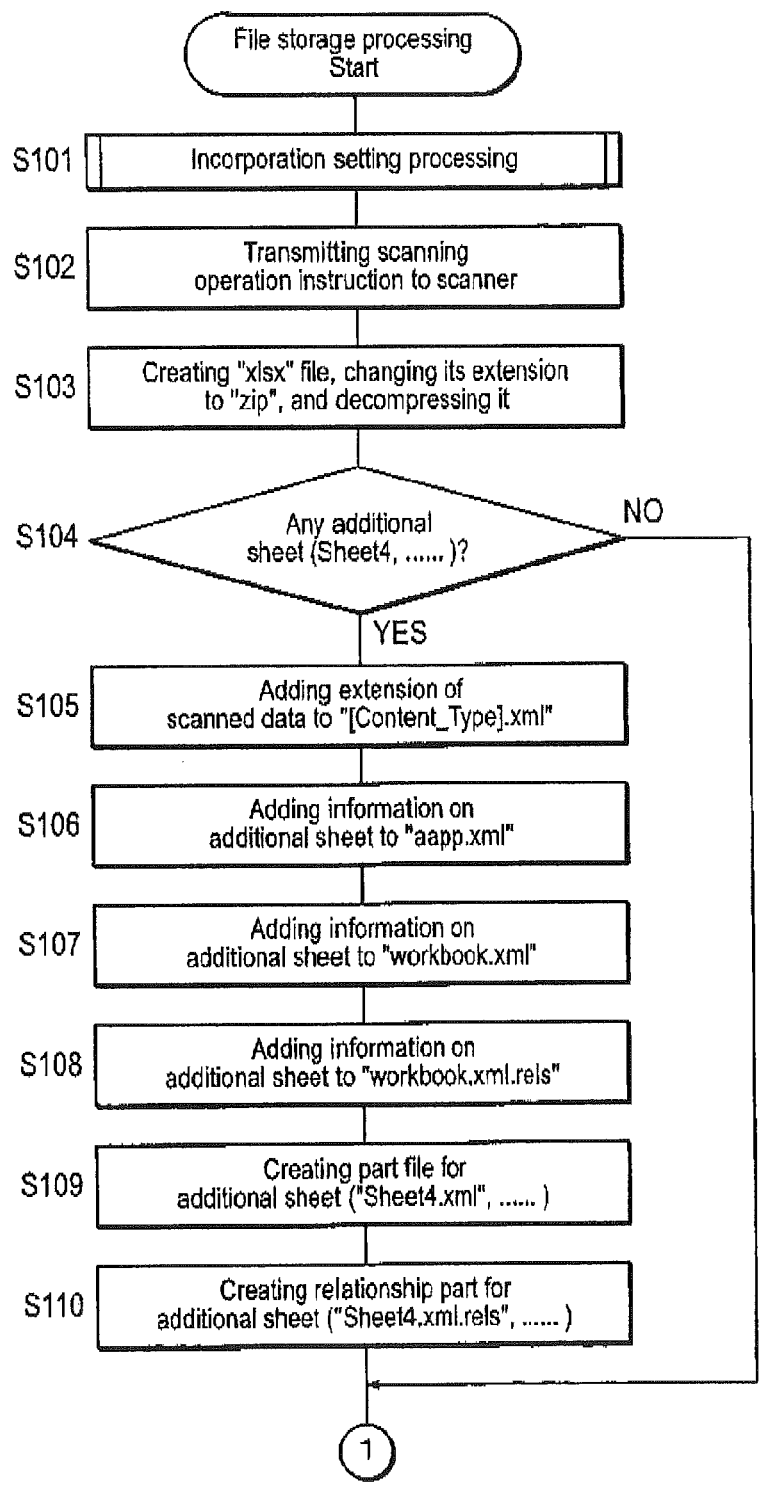
FIG. 4A is a flowchart showing steps of the PC's processing according to the first embodiment.
Figure 4B:
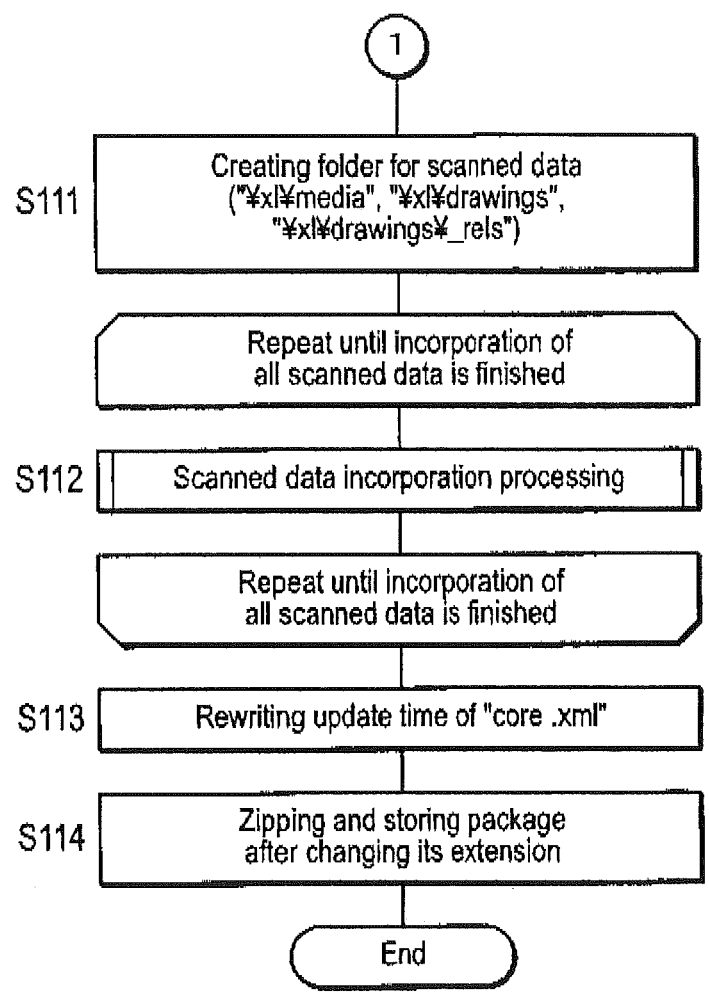
FIG. 4B is a flowchart showing steps of the PC's processing according to the first embodiment.

Next, an overview of the PC 1's operations according to the present embodiment is shown below. FIG. 4A and FIG. 4B are flowcharts showing steps of the processing executed by the PC 1 for incorporating the scanned data generated by the scanner 2 for storage in a specified format (hereinafter also referred to as "file storage processing"). The algorithm shown in the flowcharts in FIG. 4A and FIG. 4B is stored as a control program in the ROM of the storage unit 12 to be read into the RAM when the processing is launched.

Figure 5:
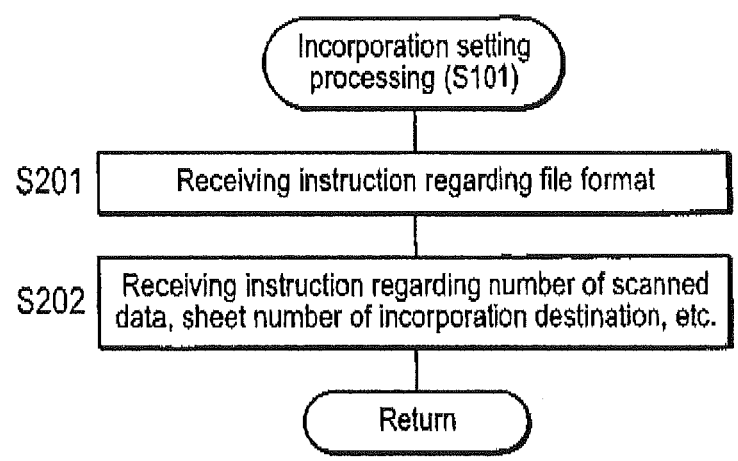
FIG. 5 is a flowchart showing steps of the PC's processing according to the first embodiment.

Firstly, the PC 1 executes incorporation setting processing (S101) for receiving user's instructions regarding the incorporation of the scanned data. Specific steps in the incorporation setting processing (S101) are shown below with reference to FIG. 5. Firstly, the PC 1 displays an UI screen (not shown) by means of the scanner driver to receive instructions regarding a user-specified file format for incorporating the scanned data (S201).

In the present embodiment, the file format for incorporating the scanned data can be any file format as long as it is equipped with a plurality of display areas (i.e. pages, sheets, etc.) like Word and Excel. The following explanation assumes that an Excel file in the OOXML format is specified by user.

After receiving user's instructions regarding the number of scanned data files to be generated by the scanner 2, the sheet number of the incorporation destination for each scanned data file, etc. on the UT screen (S202), the PC 1 returns to the flowchart in FIG. 4A (Return). The following explanation also assumes that the number of the scanned data files to be generated by the scanner is "3", and the sheet numbers of the incorporation destinations of these scanned data files (i.e. Scanned data 1, 2, and 3) are Sheet1, Sheet2, and Sheet3, respectively.

With reference to FIG. 4A again, the PC 1 transmits instructions regarding the scanning operation based on user's incorporation settings obtained in S101, to the scanner 2 by means of the scanner driver (S102). After that, the PC 1 creates an Excel file in the COXLM format (with file extension "xlsx") anew, changes its extension to "zip" and then decompresses the file with the changed extension (S103).

As can be seen from the above, prior to the generation of the scanned data files by the scanner 2, the PC 1 receives user's instruction regarding the incorporation destination sheet. However, the PC 1 according to the present embodiment can also display a preview of the scanned data files on the UI screen after generating them by the scanner 2, in order to receive user's instruction regarding the incorporation destination via the UI screen.

Next, the PC 1 determines whether or not additional sheets starting with the fourth sheet (Sheet4, . . . ) is designated as the loading destinations of the scanned data files with reference to user's incorporation settings obtained in S101 (S104). The reason for executing this determination step is because the newly-created Excel file is equipped with 3 sheets alone, and the designation of additional sheets would entail modification of the relevant part files within the package for creating the additional sheets.

The PC 1 then moves onto the steps from S105 to S110 to be described later if additional sheets are designated as the loading destination (S104: Yes) while moving directly onto S111 if additional sheets are not designated (S104: No). Details of the steps S105 through S110 are shown below.

Firstly, the PC 1 adds to the part file "[Content_Type].xml" in the package of the newly created Excel file in S103, the extension of the scanned data files to be incorporated into the Excel file. More specifically, supposing that the file format of the scanned data files created by the scanner 2 is "JPEG", such a data string as shown in FIG. 7 is be added to the part file "[Content_Type].xml".

The PC 1 then adds the information regarding the additional sheets to each of the part files "app.xml" in the folder "¥docProps", the part file "workbook.xml" in the folder "¥xl", and the part file "workbook.xml.rels" in the folder "¥xl¥_rels" (S106, S107 and, S108, respectively). Next, the PC 1 newly creates part files "sheet4.xml", . . . for the additional sheets, and adds these part files to the folder "¥xl¥worksheets" (S109). Next, the PC 1 newly creates part files "sheet4.xml.rels", . . . for the additional sheets, and adds these part files to the folder "¥xl¥worksheets¥_rels" (S110).

The newly created part files in S109 and S110 (i.e. "sheet4.xml", . . . and "sheet4.xml.rls", . . . ) will receive information on the additional sheets in the scanned data incorporating processing (S112) to be described later.

Next, the PC 1 newly creates a folder "¥xl¥media" for storing the scanned data files as well as the folders "¥xl¥drawings" and "¥xl¥drawings¥_rels" for storing various part files showing information on the scanned data files, and adds these folders to the package (S111).

Next, the PC 1 repeats the scanned data incorporation processing (S112) to be described later for each scanned data file created by the scanner 2. After finishing the scanned data incorporation processing in S112 for all the scanned data files, the PC 1 then rewrites the update time for the part file "core.xml" in the folder "¥docProps" (S113). More specifically, in S113, the relevant portion in the part file "¥docProps¥core.xml" is replaced with the data string shown in FIG. 9.

The PC 1 then zips the package after the modification in the steps from S103 to S113, and stores it after changing its file extension to "xlsx" (S114). The storage destination of the zipped file can be either the storage unit 12 of the PC 1 or the storage unit 22 of the scanner 2, or even an external storage device connected to the network N. After that, the PC 1 finishes the file storage processing (End).

Figure 6:
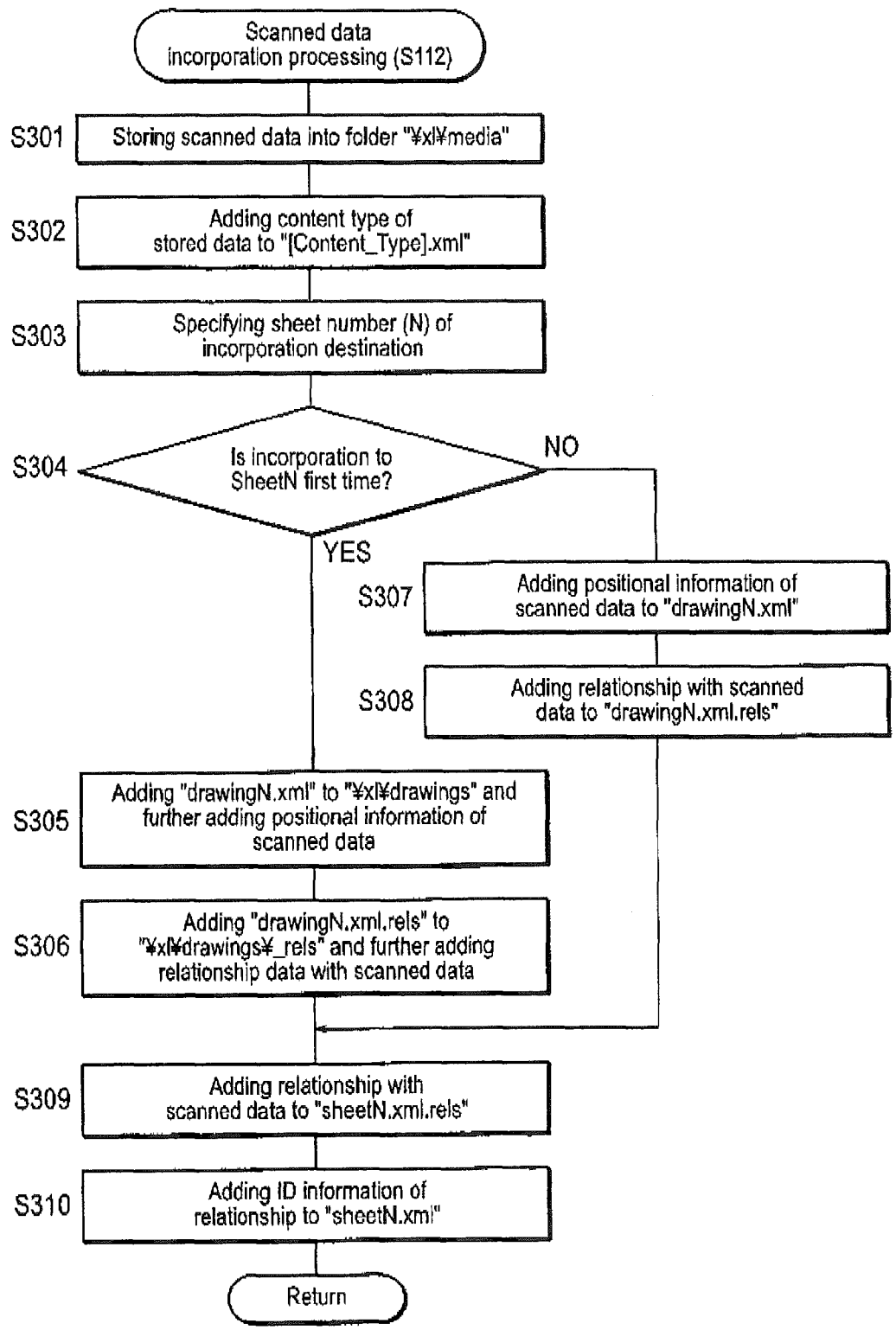
FIG. 6 is a flowchart showing steps of the PC's processing according to the first embodiment.
Figure 18:
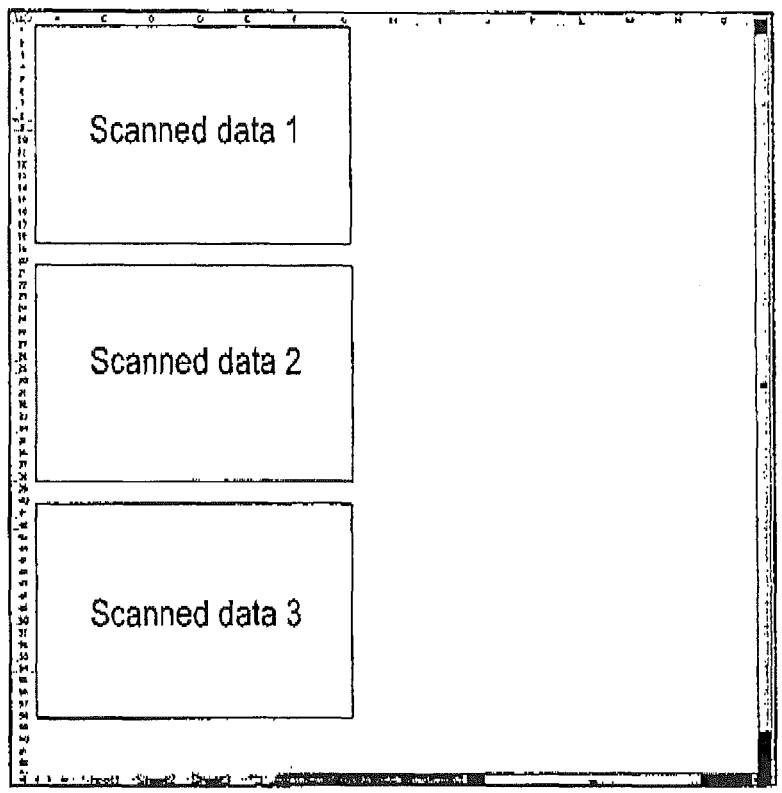
FIG. 18 is a schematic diagram showing an Excel file into which scanned data has been incorporated by an ordinary image scanning system.

Specific steps in the scanned data incorporation processing in S112 are described below with reference to FIG. 6. Firstly, the PC 1 stores the scanned data files generated by the scanner 2 to the folder "¥xl¥media" created in S111 (S301). The PC 1 adds the content type of the scanned data files stored in S301 to the part file "[Content_Type].xml" in the package (S302). More specifically, the step S302 involves modification of the part file "[Content_Type].xml" in accordance with the following steps (a) and (b).

(a) Adding the extension of the scanned data files. More specifically, such a data string as shown in FIG. 7 is added if the file format of the scanned data files created by the scanner 2 is "JPEG". Nevertheless, the step (a) is skipped if the aforementioned S105 has already been performed.

(b) Adding the part name (i.e. "Part Name") and the content type (i.e. "ContentType") of the scanned data. For example, such a data string as shown in FIG. 8 is added as a result of repetition of the step (b) for the scanned data 1 to 3. The part name (i.e. "PartName") can be any character string while the FIG. 8 illustrates a default which is made of a combination of the character string "drawing" and the serial number. The content type (i.e. "ContentType") is a predefined value for each content type.

Next, the PC 1 specifies the sheet number of the scanned data's incorporation destination (S303) by referring to the incorporation settings obtained in S101. The sheet number specified in S303 is hereinafter referred to as "N" for the sake of convenience. The PC 1 then determines whether or not data incorporation into SheetN is the first time ever (S304), and branches the subsequent steps in accordance with the determination result.

If the data incorporation into SheetN is the first time (S304: Yes), the PC 1 creates the part file "drawingN.xml" which describes positional information of the scanned data to be incorporated into SheetN, and adds the part file to the folder "¥xl¥drawings" which has been created in S110. The positional information of the scanned data to be incorporated into SheetN is thus added to the part file "drawingN.xml" in the folder "¥xl¥drawings" (S305). More specifically, such a data string as shown in FIG. 13 is added to the part file in S305.

Next, the PC 1 newly creates a part file "drawingN.xml.rels" which describes relationship of the part file "drawingN.xml", and adds the part file to the folder "¥xl¥drawings¥rels" which has been created in S110. The PC 1 then adds the relationship with the target resource (i.e. scanned data file) to the part file "drawingN.xml.rels" in the folder "¥xl¥drawings¥rels" (S306).

More specifically, such data strings as shown in FIGS. 10, 11, and 12 are added to the relationship part file (i.e. "drawingN.xml.rels") in S306. FIGS. 10, 11, and 12 correspond to N=1, 2, and 3 respectively. The "Relationship Id" shown in each drawing is the identification number of each relationship, and is an unique character string within each relationship part file (Same in FIGS. 14, 15, and 16). The "Type" herein refers to type of relationship, and is a predefined value for each type of the target part files (Same in FIGS. 14, 15, and 16). The "Target" herein refers to data path to the target part file i.e. the scanned data file in this example (Same in FIGS. 14, 15, and 16). It can be seen from FIGS. 10, 11, and 12 that the target resources corresponding to the source part files "drawing1", "drawing2", and "drawing3" are "image1.jpeg", "image2.jpeg", and "image3.jpeg", respectively.

On the other hand, if the incorporation into SheetN is not the first time (S304: No), the PC 1 adds positional information of the scanned data file to be incorporated into SheetN, to the part file "drawingN.xml" which has been added to the folder "¥xl¥drawings" (S307). The PC 1 then adds the relationship with the scanned data file to be incorporated into SheetN, to the part file "drawingN.xml.rels" which has been added to the folder "¥xl¥drawing¥_rels" (S308).

The PC 1 then adds the relationship between SheetN and the scanned data file to be incorporated into SheetN, to the part file "drawingN.xml.rels" in the folder "¥xl¥drawing¥_rels" (S309). For example, such data strings as shown in FIGS. 14, 15, and 16 are added to the relationship part file (i.e. "sheetN.xml.rels") in S309, FIGS. 14, 15, and 16 correspond to N=1, 2, and 3, respectively.

Next, the PC 1 adds the ID information of the relationship which has been added to the part file "sheetN.xml.rels" in S309, to the part file "sheetN.xml" in the folder "¥xl¥worksheets" (S310). FIG. 17 illustrates content of the part file "sheetN.xml" which has received the ID information in S310. In this example, as the relationship ID to be added to the part file "sheetN.xml" in S309 is "rId2" regardless of "N" (See FIGS. 14, 15, and 16), the letter string "<drawing r:id="rId2"/>" is added in S310 as the ID information of the relationship (See the italics portion in FIG. 17).

Figure 19:
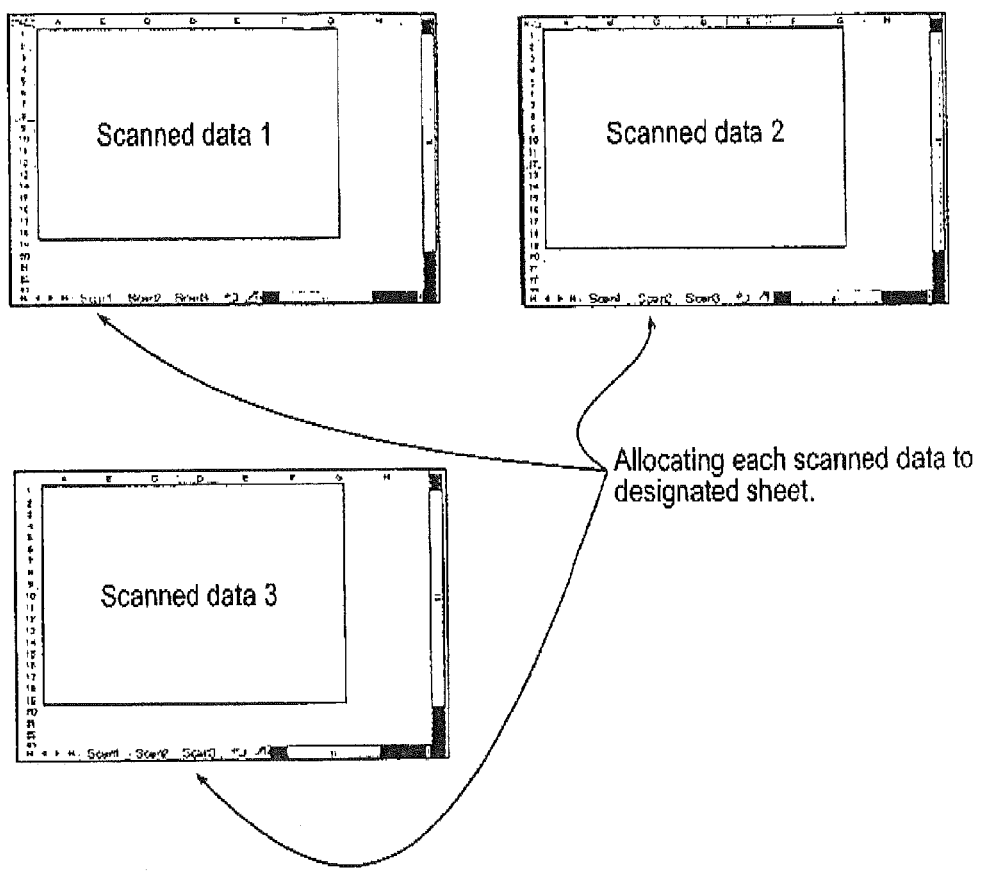
FIG. 19 is a schematic diagram showing an Excel file into which scanned data has been incorporated by an image scanning system according to the first embodiment.

After that, the PC 1 repeats the same processing for the remaining scanned data files, and returns to the flowchart of FIG. 4B when it finishes all the scanned data files. As a result of modifying the relevant part files in the package in accordance with the flowchart in FIG. 4B (See FIG. 7-17), the scanned data 1, 2, and 3 created by the scanner 2 will be allocated to the user-designated spread sheets as shown in FIG. 19 (i.e. Sheet1, Sheet2, and Sheet3, respectively).

As can be seen from the above, the PC 1 according to the present embodiment for incorporating one or more scanned data files generated by the scanner 2 for storage into an Excel file in the OOXML format, is capable of modifying the relevant part files of the Excel file so that the scanned data files will be allocated to user-designated display areas (i.e. spreadsheets). Therefore, the present embodiment can substantially reduce the burden on user who tries to make efficient use of the data files incorporated into an Excel file.

The Image scanning device according to the present embodiment can also be an MFP (multifunction Peripheral) equipped with printing and copying functions in addition to a scanning function while the present embodiment uses the scanner 2 as an example. Furthermore, the data processing device according to the present embodiment can also be a built-in device of an image forming device with a scanning function such as a MFP. This means that the present embodiment also cover the aspect of the present invention where a single image forming device performs all the steps of creating scanned data, incorporating the scanned data into a file in a specified format, and finally storing the file into an internal storage device such as a HDD or an external storage device such as a USB memory storage device, by itself.

The file format of the incorporation destination according to the present invention can be any file format equipped with a plurality of display areas such as spreadsheets and pages although the present embodiment uses an Excel file and a Word file in the OOXML format as examples.

Figure 21:
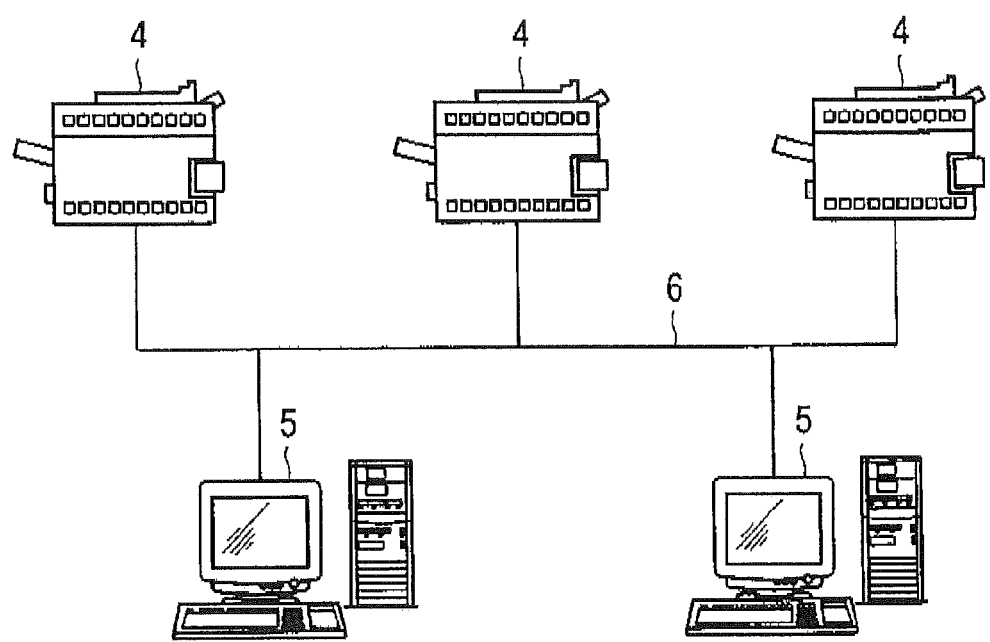
FIG. 21 is a network diagram showing the structure of an image forming device according to the second embodiment of the present embodiment.

The second embodiment of the present invention will be described below. FIG. 21 is a block diagram showing the structure of the image forming device 4 which serves as a data processing device according to the present embodiment.

The image forming device 4 is connected to a communication line 6 so that it can communicate with the PC 5. The communication line 6 creates a network between the image forming device 4 and the PC 5. The communication line 6 can conform to any communication method as long it ensures connection between the PC 5 and the image forming device 4. For example, the communication line 6 can be a wired network using an Ethernet (registered trademark) cable, a coaxial cable, optical fiber etc., a wireless network based on various standards, or any combination of these wired and wireless communication methods. The communication line 6 can also be LAN (Local Area Network), Internet, or any other network in an arbitrary scale.

Figure 22:
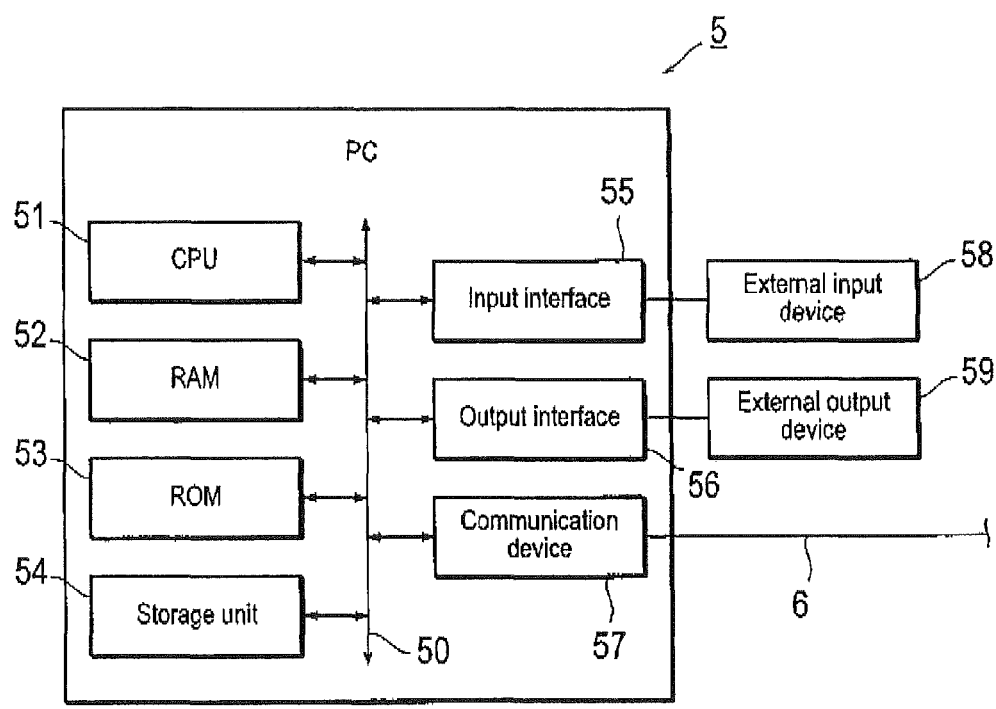
FIG. 22 is a block diagram showing the structure of a PC according to the second embodiment.

FIG. 22 is a block diagram showing the structure of the PC 5. The PC 5 is equipped with a CPU (Central Processing Unit) 51, a RAM (Random Access Memory) 52, a ROM (Read Only Memory) 53, a storage unit 54, an input interface 55, an output interface 56 and a communication device 57, all of which are connected by a bus 50.

The CPU 51 cooperates with the programs stored in the ROM 53, and controls the operations of the PC 5 in accordance with the programs and data read into the RAM 52. The RAM 52 stores various data created as a result of the processing of the CPU 51 as well as temporary data generated in the course of the same processing. The ROM 53 stores the programs and data retrieved by the CPU 51.

The storage unit 54 stores the programs and data retrieved by the CPU 51. The storage unit 54 is a rewritable storage unit formed by a combination of a flash memory, a hard disk drive, and any other rewritable storage device.

The input interface 55 is an interface for receiving an input from an external input device 58. The external input device 58 is typically a keyboard and a mouse, and is used to receive user's manual input.

The output interface 56 is an interface for sending an output to an external output device 59. The external output device 59 is typically a display device such as a CRT or a LCD for displaying an output screen based on the processing result of the CPU 51.

The communication device 57 makes a connection between the PC 5 and an external communication network (e.g. communication line 6) to enable the PC 5 to communicate with an external equipment. The communication device 57 is typically a NIC (Network Interface Card), and is capable of making a connection in accordance with various types of communication methods.

Figure 23:
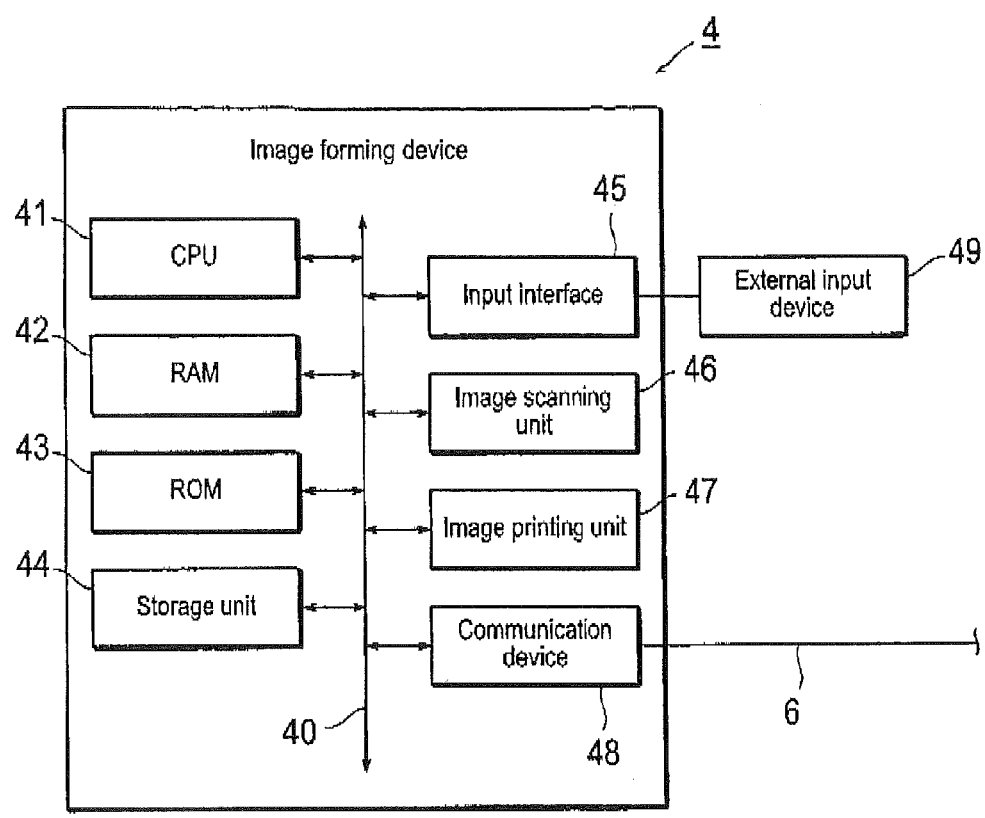
FIG. 23 is a block diagram showing the structure of an image forming apparatus according to the second embodiment.

FIG. 23 is a black diagram showing the structure of the image farming apparatus 4. The image forming devices 4 shown in FIG. 21 have the same structure, and therefore the following explanation is common to all of them. The image forming device 4 is equipped with a determination unit, a CPU 41 which functions as a control unit, a RAM 42, a ROM 43, a storage unit 44, an input interface 45, an image scanning unit 46 which functions as an acquisition unit, an image printing unit 47, and a communication device 48, all of which are connected via the bus 40.

The CPU 41 cooperates with the programs stored in the ROM 43, and controls the operations of the image forming device 4 in accordance with the programs and data read into the RAM 42. The RAM 42 stores the data created as a result of the processing of the CPU 41 as well as temporary data generated in the course of the same processing. The ROM 43 stores the programs and data retrieved by the CPU 41.

The storage unit 44 stores the programs and data retrieved by the CPU 41. The storage unit 44 is a rewritable storage unit formed by a combination of a flash memory, a hard disk drive, and any other rewritable storage device.

The input interface 45 is an interface for receiving an input from an input device such as an external input device 49. The external input device 49 is typically an operation panel with a touch screen which allows user to enter various instructions.

The image scanning unit 46 is equipped with an ADF unit, a platen glass, and an optical system such as CCD image sensors, realizing a function to scan a document image placed on the ADF or the platen glass by the optical system. The image data obtained by scanning the image document with the image scanning unit 46 (i.e. analogy image signals) is put into A/D conversion and various image processing, before being stored into the storage unit 44 in the form of digital image data (or an image data file) and being output to the image printing unit 47.

The image printing unit 47 executes image forming (i.e. print processing) based on the input image data. The printing method used by the image printing unit 47 can be the electronic photography method, the ink-jet method, the thermal transfer method, the offset method, etc. In the present embodiment, the image printing unit 47 performs image forming by means of the electronic photography method.

The communication device 48 makes a connection between the image forming device 1 and an external communication network (e.g. communication line 6) to enable the image forming device 4 to communicate with external equipment. The communication device 48 is typically a NIC (Network Interface Card), and is capable of making connection in accordance with various types of communication methods.

Figure 24:
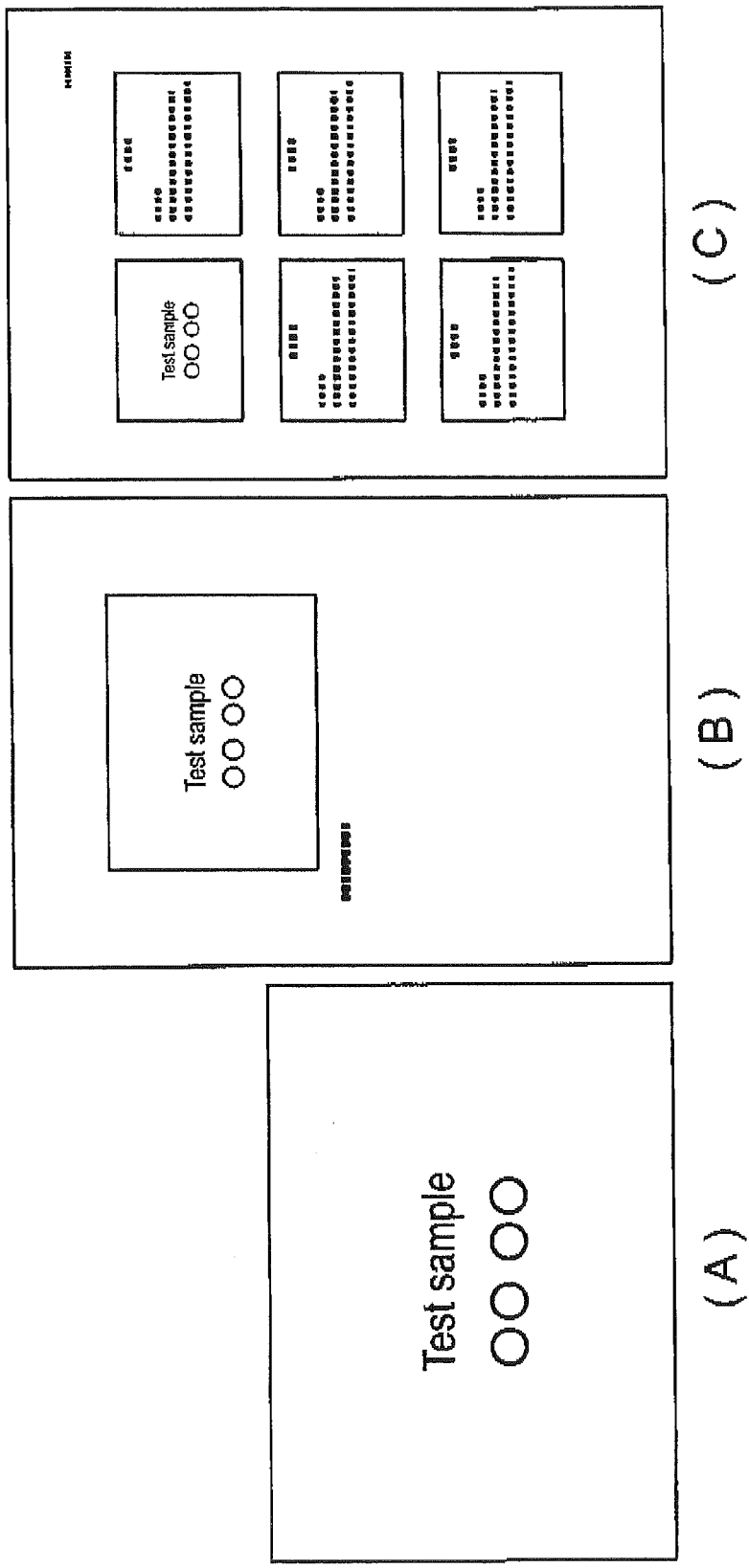
FIG. 24 is a schematic diagram showing paper documents in the slide mode, the note mode, and the distribution mode.

Next, the image layouts of a paper document to be scanned by the image scanning unit 46 will be described below with reference to FIG. 24. The following is an explanation of the image layout in the case where Microsoft PowerPoint (registered trademark) is used as an application software (hereinafter referred to as "application") to print out the paper document. As shown in FIG. 24, the image layout of the paper document can be a slide mode (See FIG. 24 (A)), a note mode (See FIG. 24 (b)), or a distribution mode (See FIG. 24 (C)).

A paper document in the slide mode takes a form of a one-page slide image. The slide image herein refers to an image formed on a PowerPoint slide, and it also contains various images such as letters, lines, tables, figures, and photographs. A paper document in the note mode takes a form of a one-page slide image and a note image. The note image consists of a text image such as a memorandum concerning the slide image. A paper document in the distribution mode takes a form of slide images for a plurality of pages.

Figure 25:
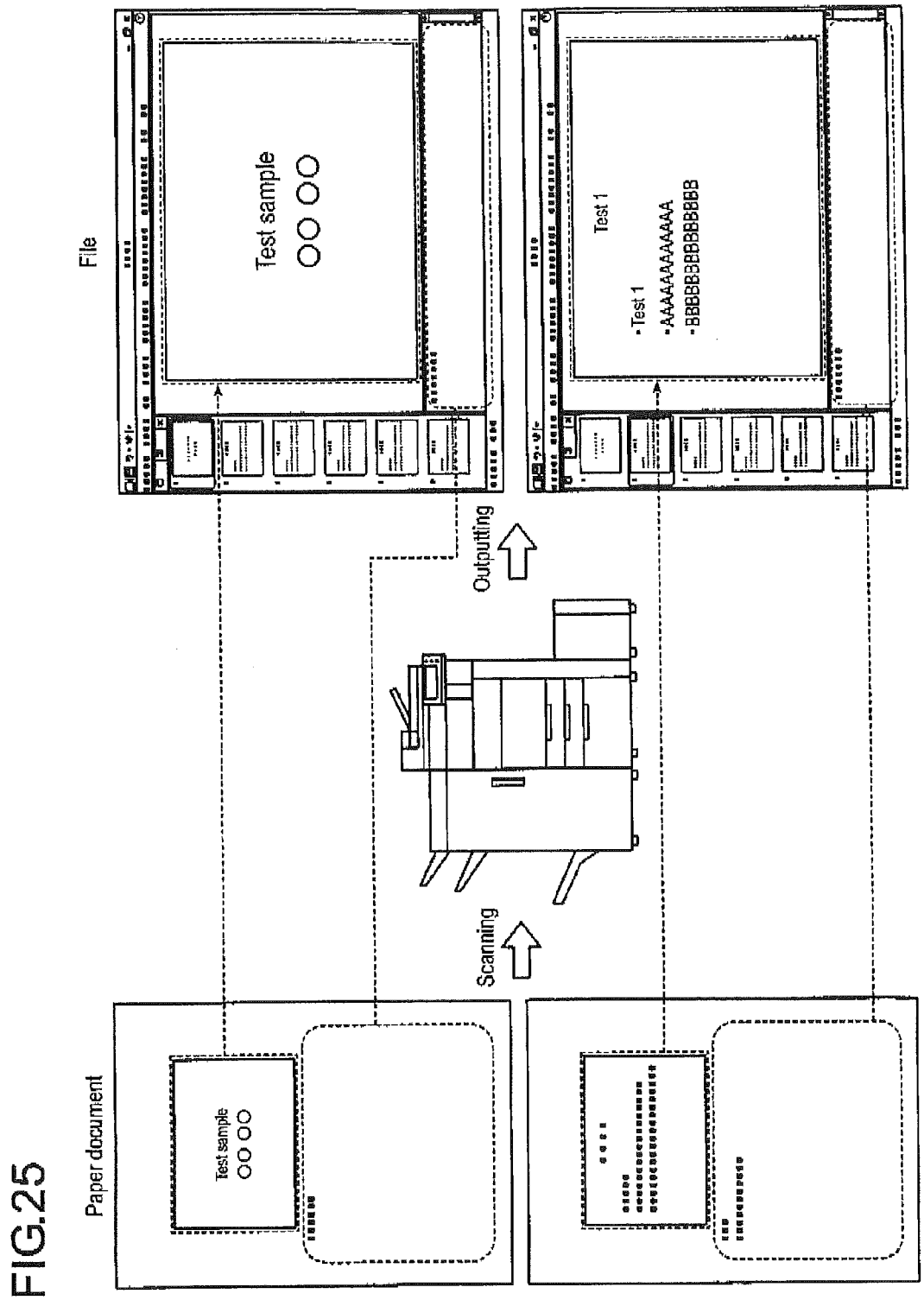
FIG. 25 is a schematic diagram showing a file to be output when a paper document in the note mode is scanned by an image scanning part.

Next, the process flow for scanning a paper document to output the scanned paper document in an electronic file which can be edited by PowerPoint is shown below. When a paper document in the note mode is scanned by the image scanning unit 46 as shown in FIG. 25, for example, image data (or an image data file) consisting of a one-page slide image and a note image is acquired. Vector data is then generated based on the acquired image data. The generate vector data is then output as a file in the note mode. In other words, the output file in the note mode is stored in the storage unit 44. When user enters an instruction to edit a file in the note mode, the file in the note mode is read out from the storage unit 44 to be displayed on the touch screen of the external input device 49 (See FIG. 25). The file in the note mode can also be transmitted to the PC 5 via the communication device 48 to be displayed on the external output device 59. This will allow user to edit a file in the note mode, thereby enhancing convenience for user.

Figure 26:
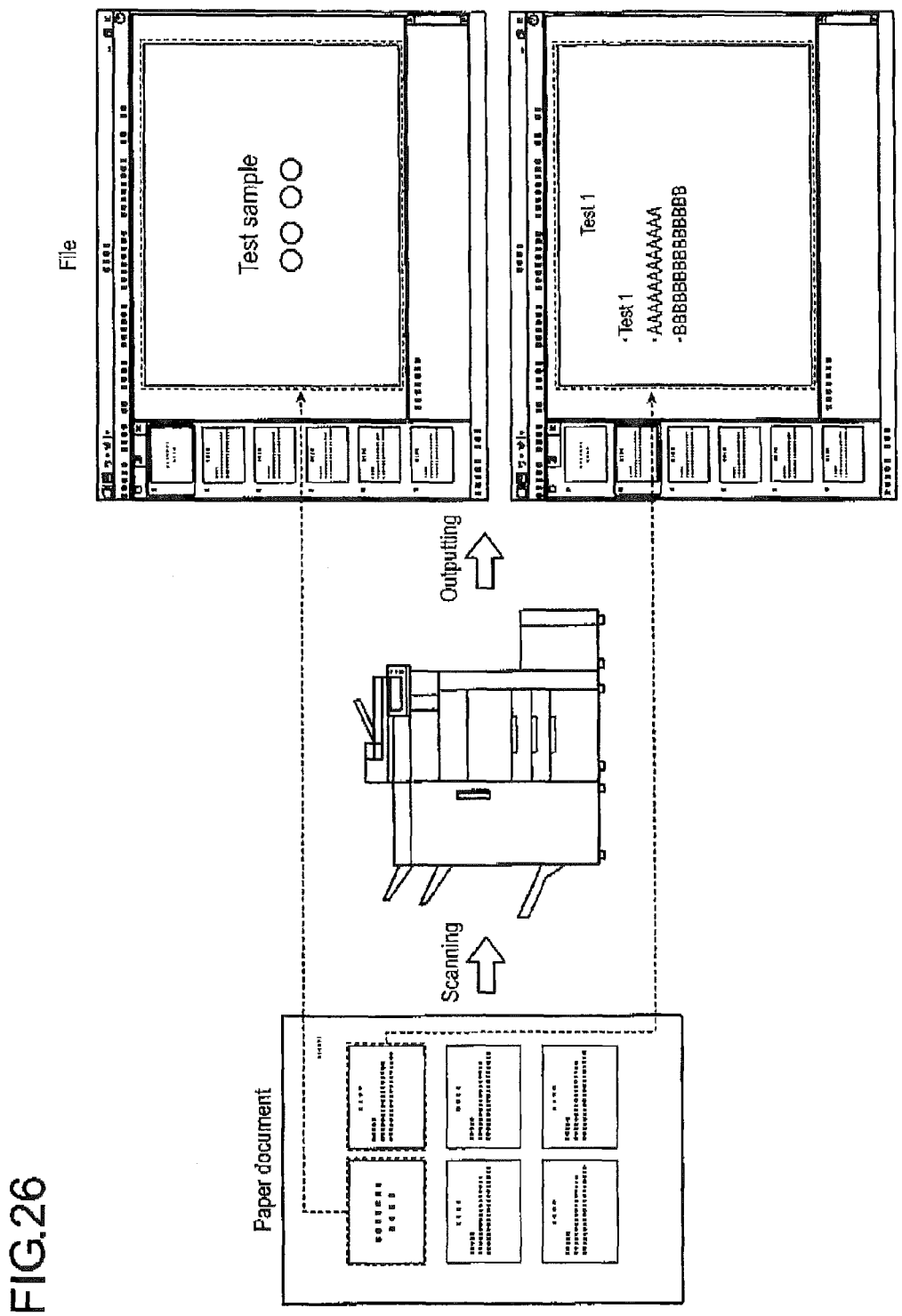
FIG. 26 is a schematic diagram showing a file to be output when a paper document in the distribution mode is scanned by an image scanning unit.

When a paper document in the distribution mode is scanned by the image scanning unit 46 as shown in FIG. 26, image data (or an image data file) consisting of slide images for a plurality of pages is acquired. Vector data is then generated based on the acquired image data. The generated vector data is then stored as a file in the distribution mode into the storage unit 44. When user enters an instruction to edit a file in the distribution mode, the file in the distribution mode is read out from the storage unit 44 to be displayed on the touch screen of the external input device 49 or on the external output device 59 (See FIG. 26). This will allow user to edit a file in the distribution mode, thereby enhancing convenience for user.

Moreover, when a paper document in the slide mode is scanned by the image scanning unit 46, image data (or an image data file) consisting of a one-page slide image is acquired (not shown), and a file in the slide mode is output in accordance with the procedure illustrated in FIG. 25 and FIG. 26. This will allow user to edit a file in the slide mode, thereby enhancing convenience for user.

Figure 27:
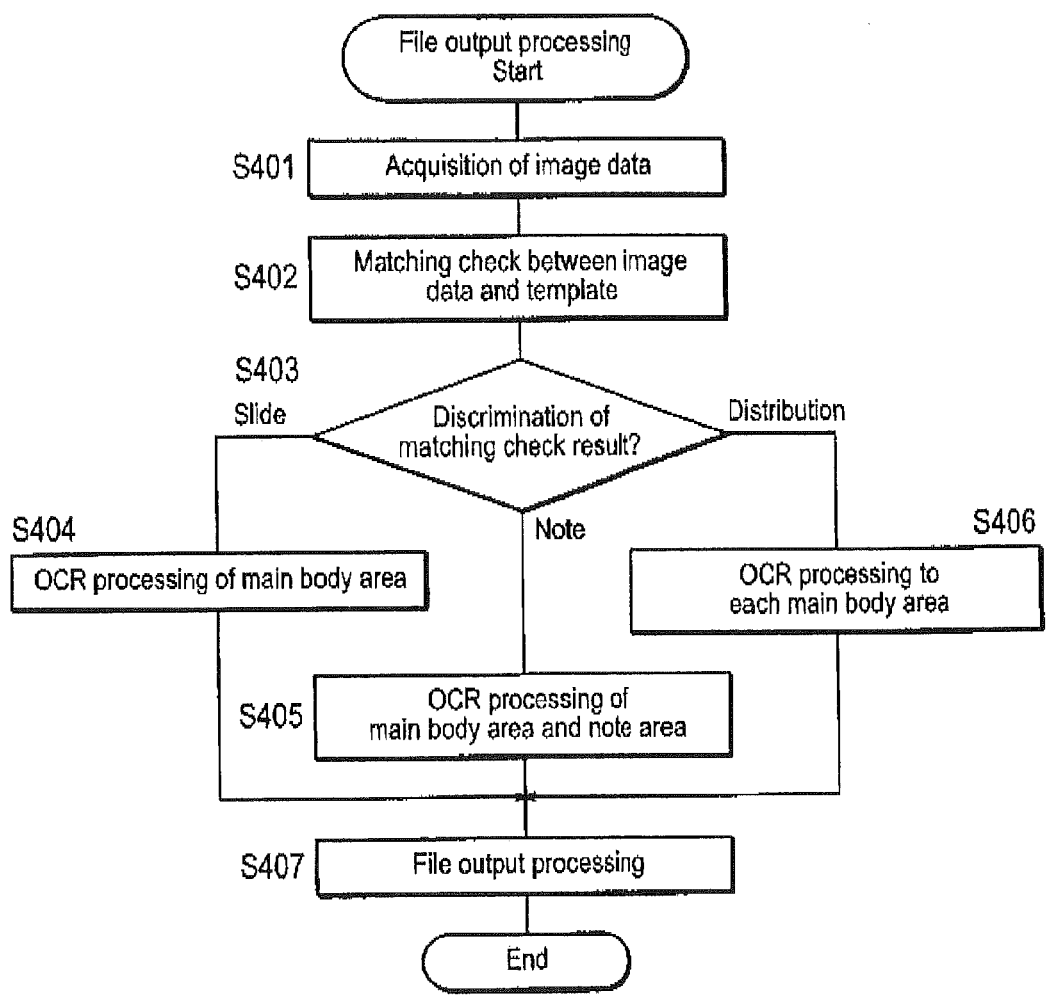
FIG. 27 is a flowchart showing steps of the file output processing according to the second embodiment.

Next, the file output processing will be described below with reference to FIG. 27. The file output processing includes acquiring image data by scanning a paper document with the image scanning unit 46, determining whether or not the image layout of the acquired image data matches with the image layout of a predefined template, generating vector data from the acquired image data, and outputting the generated vector data in the matching image layout with the template.

Figure 28:
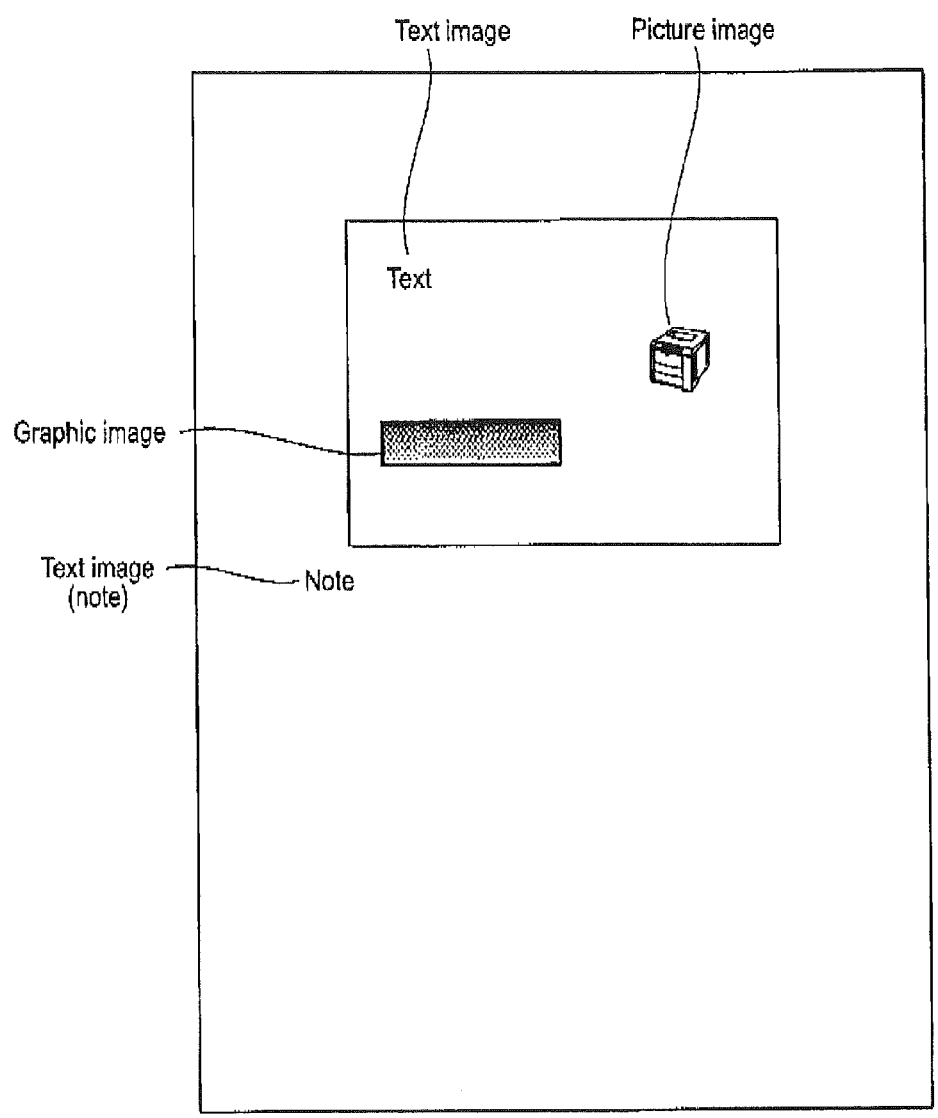
FIG. 28 is a schematic diagram showing a paper document in the note mode.

The following explanation assumes that a paper document in the note mode (See FIG. 28) is placed on the ADF or on the platen glass. As shown in FIG. 28, the slide image in the paper document in the note mode includes a text image, a picture image, and a graphic image. The note image in the paper document also includes a text image (a text image within a note image is hereinafter referred to as "a text image (note)").

The following explanation also assumes that a selection screen for allowing user to select an application to be used is displayed on the touch screen of the external input device 49 beforehand, and user selects "PowerPoint" as the application to be used via the external input device 49.

The file output processing (See FIG. 27) by the image forming device 4 can be triggered by user's depression of the scan button on the external input device 49 for initiating the scanning of a paper document, for example.

Firstly, the image data acquisition is performed (S401). In other words, the image forming device 4 scans the paper document by the image scanning unit 46 to acquire image data. The acquired image data (i.e. analog image signals) is put into A/D conversion. Then, various image processing is applied to the image data after the A/D conversion, and the digital image data after the image processing is stored into the storage unit 44.

After the execution of S401, the image data stored in the storage unit 44 is retrieved, and a matching check of the retrieved image data is carried out by using a predefined template (S402). The matching check is intended to determine whether or not the image layout of the retrieved image data matches with the template. Details of the predefined template are shown below with reference to FIG. 29. The template in the present embodiment is a typical file used for identifying the image layout of the retrieved image data. If the matching check reveals that the image layout of the retrieved image data matches with the template, the image layout of the template is determined as the image layout of the retrieved image data. In the present embodiment, three different templates (i.e. a template in the slide mode, a template in the note mode, and a template in the distribution mode) are stored in the storage unit 44 to be used for the matching check.

Figure 29:
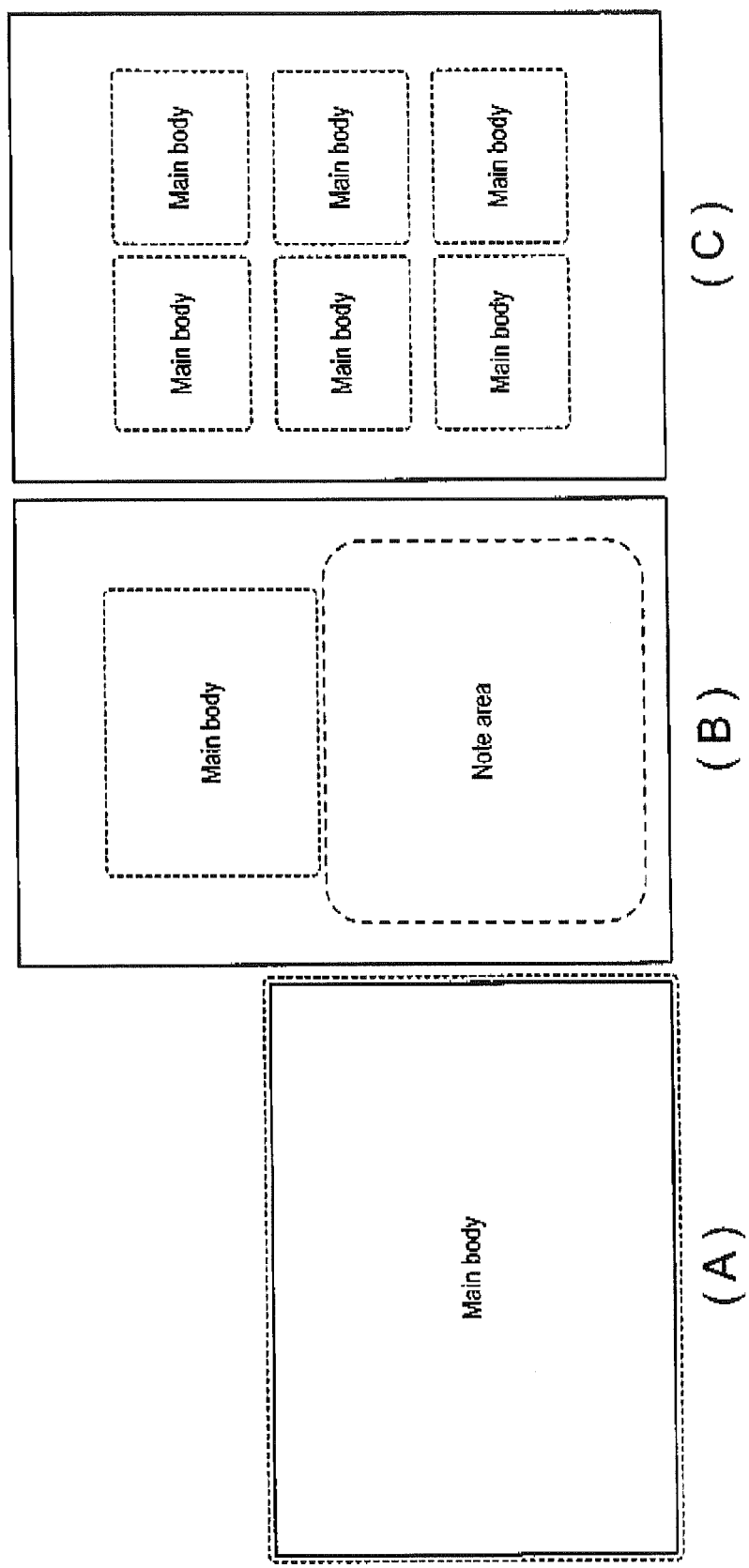
FIG. 29 is a schematic diagram showing the templates in the slide mode, the note mode, and the distribution mode.

The template in the slide mode (See FIG. 29 (A)) consists of image data of a one-page slide image. When the image data matches with the template in the slide mode, the slide mode is determined as the image layout of the image data. The template in the note mode (See FIG. 29 (B)) consists of image data of a one-page slide image and image data of a note image. When the image data matches with the template in the note mode, the note mode is determined as the image layout of the image data. The template in the distribution mode (See FIG. 29 (C)) consists of image data of slide images for a plurality of pages. When the image data matches with the template in the distribution mode, the distribution mode is determined as the image layout of the image data. Meanwhile, the image data area of the one-page slide image is defined as "main body area" of the template, and the image data area of the note image is defined as "note area" of the template. The main body area and the note area are also defined generically as "template data area".

The following is an explanation of the matching check in the case where a paper document in the note mode (See FIG. 28) is scanned, and image data consisting of a one-page slide image and a note image is acquired. The matching check is intended to compare the acquired image data with the template data area, to calculate a score showing matching degree between the image layout of the image data and the image layout of each template by checking whether or not the image data fits into the template area and to determine the image layout based on the calculated score.

Firstly, the acquired image data and the template data area are compared with each other, and it is determined whether or not the image data fits into the template data area. The acquired image data herein consists of a one-page slide image and a notebook image. In this case, it is determined whether or not the one-page slide image and the note image in the acquired image data fit into the template area of each template.

In this example, the image data and the template area (i.e. the main body area and the note area) in the note mode (See FIG. 29 (B)) are compared with each other, and it is determined that the image data fits into the main body area and the note area of the template as a whole when the one-page slide image and the note image fit into the main body area and the note area of the template, respectively. In this case, "10 points" are scored as the image data fits into the main body area, and additional "10 points" are scored as the image data also fits into the note area. In other words, "20 points" are scored in total for the template in the note mode.

Similarly, the image data and the template area (i.e. the main, body area) in the slide mode (See FIG. 29 (A)) are compared with each other, and "0 point" is scored for the template in the slide mode if it is determined that the one-page slide image and the note image data of the image data does not fit into the main body area of the template.

Similarly, the image data and the template area (i.e. the main body area) in the distribution mode (See FIG. 29 (C)) are compared with each other, and "0 point" is scored for the template in the distribution mode if it is determined that the one-page slide image and the note image in the image data does not fit into the main body area of the template. After calculating these scores, it is determined that image layout of the image data matches with the template with the highest score (i.e. the note mode).

The aforementioned matching check can also involve user's selection of a template in the case where the calculated scores are below a certain level. More specifically, selection information showing the image layout of each template for user's selection can be displayed on the touch screen of the external input device 49 for user's selection of the template if the calculated scores are below a certain level. The selection information can also be transmitted to the PC 2 via the communication device 48 to be displayed on the external output device 59.

With reference to FIG. 27 again, discrimination of the matching check result is carried out after the execution of S402 (S403). If the discrimination of the matching check result reveals that the image layout of the image data matches with the template in the slide mode (S403: Slide), the OCR processing is executed for the main body area of the image data (S404). If the discrimination of the matching check result reveals that the image layout of the image data matches with the template in the note mode (S403; Note), the OCR processing is executed for the main body area and the note area of the image data (S405). If the discrimination of the matching check result reveals that the image layout of the image data matches with the template in the distribution mode (S403; Distribution), the OCR processing is executed for the main body area of the image data (S406). The main body area of the image data herein refers to the data area of the image data which corresponds to the main body area of the template. The note area of the image data herein refers to the data area of the image data which corresponds to the note area of the template. The image data can be classified into either the main body area or the note area, based on the presence or absence of a frame in the image data itself. As a result of the OCR processing in the steps from S404 to S406, vector data is generated from the image data.

After the execution of the steps from S404 to S406, the file output processing is executed (S407). The file output processing is intended to output the vector data in the image layout of the template with which the image layout of the acquired image data matches. More specifically, the file output processing includes steps of appending the vector data to an OOXML file, which can be handled by Microsoft Word (registered trademark), Microsoft Excel (registered trademark), Microsoft PowerPoint (registered trademark), etc., generating a file in the image layout of the template with which the image layout of the acquired image data matches, and storing the generated file to the storage unit 44.

OOXML is a newly adopted file storage format (or a file format) in Microsoft Office (registered trademark) 2007. This means that OOXML is generally used as a file format for Word, Excel, Powerpoint, etc. Therefore, an OOXML file can be handled (i.e. edited) by applications such as Word, Excel, and Powerpoint.

Figure 30:
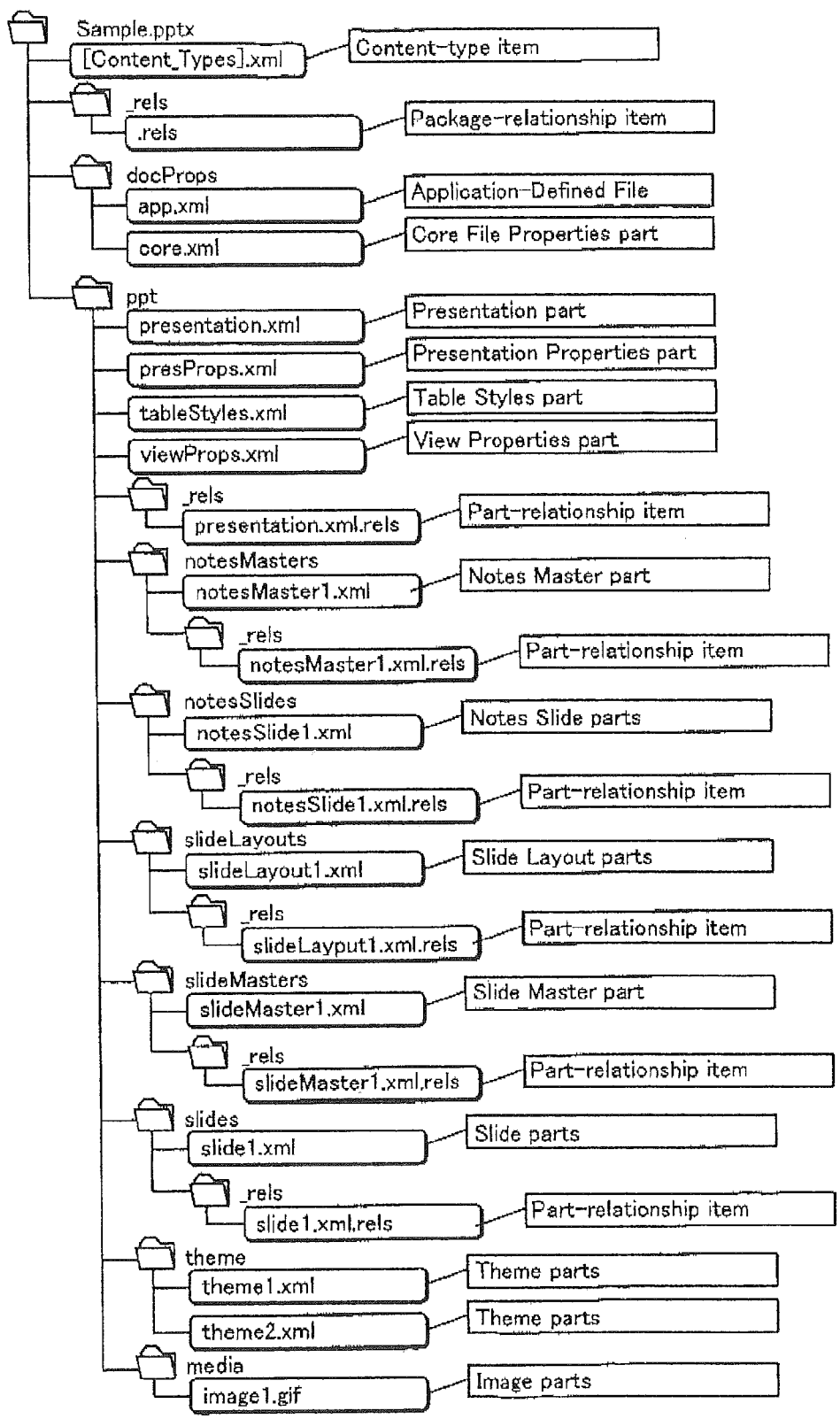
FIG. 30 is a schematic diagram showing a group of part files of the file "sample.pptx".
Figure 35:
FIG. 35 is a schematic diagram showing a file path to the media folder "ppt¥ppt¥media¥image1.gif".

The OOXML extensions for Word, Excel, and Powerpoint are "decx", "xlsx", and "pptx", respectively. User can view the content of an OOXML file "sample.pptx" by changing its extension "pptx" into "zip" and then decompressing the same file with the changed extension "zip" using a decompression software, for example. The sample OOXML file "sample.pptx" consists of a plurality of part files as shown in FIG. 30.

FIG. 31-35 show the relevant part files to the data addition for the file generation in the image layout of the template with which the image layout of the image data matches as well as the data adding positions within the relevant part files. The following examples show the relevant part files to the data addition for the file generation as well as the positions of the data addition within the relevant part files, based on the assumption that the note mode is the image layout of the template with which the image layout of the image data matches.

If the type of the image data shown in FIG. 28 is "image1.gif" for example, its content-type data needs to be added to the part file "[Content_Types].xml" (See FIG. 31) among a plurality of parts files, which consists of file definition information. More specifically, the data string indicating the content type (i.e. "gif") is added to the part file "[Content_Types].xml" (See the added portion 1 in FIG. 31).

Moreover, the vector data resulted from the OCR processing of the note area needs to be added to the part file "ppt¥notesSlides¥notesSlide1.xml" (See FIG. 32A and FIG. 32B) among a plurality of parts files, which consists of various data regarding the note area. More specifically, the vector data (i.e. the text portion in FIG. 32B) resulted from the OCR processing of the note area of the image data is added to the part file "ppt¥notesSlides¥notesSlide1.xml." The text portion in FIG. 32B corresponds to the vector data generated from the text image (note) shown in FIG. 28.

Moreover, the vector data resulted from the OCR processing of the main body area of the image data needs to be added to the part file "ppt¥notesSlides¥notesSlide1.xml" (See FIGS. 33A, 33B, 33C, and 33D) among a plurality of part files, which consists of various data regarding the main body area. More specifically, the vector data resulted from the OCR processing of the main body area of the image data (i.e. the text portion shown in FIG. 33A, the picture portion shown in FIG. 33B, and the graphic portion shown in FIG. 33C) should is added to the part file "ppt¥Slides¥Slide1.xml". The text portion in FIG. 33A corresponds to the vector data generated from the text image shown in FIG. 28, the picture portion in FIG. 33B corresponds to the vector data generated from the picture image shown in FIG. 28, and the graphic portion of FIG. 33C corresponds to the vector data generated from the graphic image shown in FIG. 28.

The relationship regarding the structure of the main body area needs to be added to the part file "ppt¥Slides¥_rels¥Slide1.xml.rels" (See FIG. 34) among a plurality of part files, which consists of various relationship data. More specifically, the data showing the relationship of the part file "image1.gif" (i.e. Relationship ID and file path in the added portion 2 shown in FIG. 34) is added to the relevant part file. The added portion 2 indicates that the picture data with the relationship ID "rId3" shown in the picture portion in FIG. 33B is stored in the media folder as "image1.gif". The media folder consists of picture image files. For example, the file path to the "image1.gif" will be "ppt¥ppt¥media¥image1.gif" when it is stored in the media folder (See FIG. 35).

As can be seen from the above, the addition of the vector data of the main body area and the note area to the file "sample.pptx" (i.e. the addition of the vector data to the relevant part files among a plurality of part files within "sample.pptx") results in the generation of the file "sample.pptx" in the notebook mode.

Figure 36:
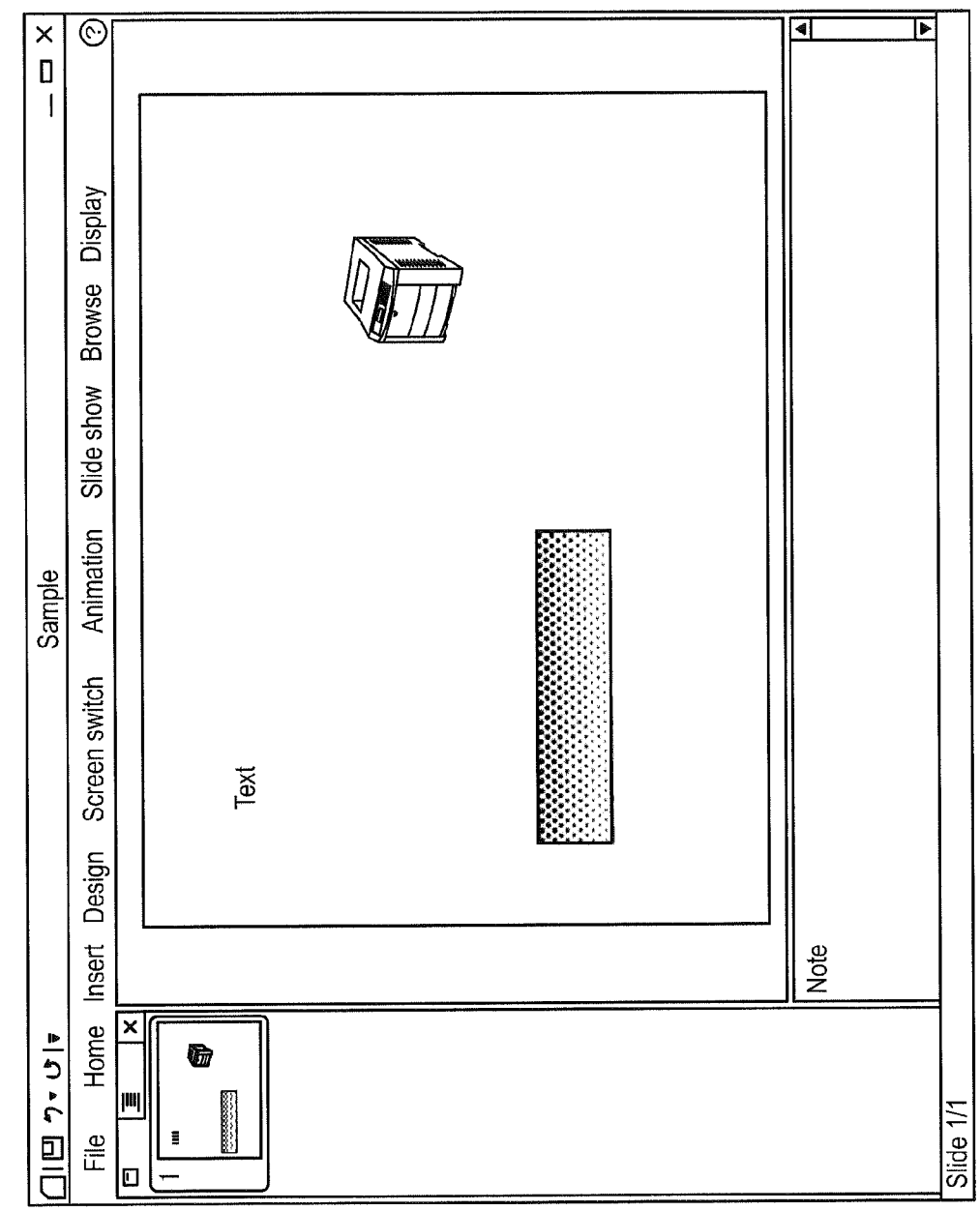
FIG. 36 is a schematic diagram showing a display image of the file "sample.pptx".

The generated file "sample.pptx" in the note mode is stored into the storage unit 44. When user enters an instruction to edit the file "sample.pptx" in the notebook mode, the file "sample.pptx" in the note mode is retrieved from the storage unit 44 to be displayed on the touch screen of the external input device 49 or on the external output device 59 (See FIG. 36). This allows user to view the file "sample.pptx" in the note mode, and therefore to edit the file "sample.pptx" via the external input device 49 or the external input device 58 using PowerPoint.

As shown in the above, the present embodiment includes determining whether or not the image layout of the acquired image data matches with the image layout of the template by comparing the acquired data and the template area in the template in order to determine whether or not the acquired image data fits into the template area. Thus, the present embodiment ensures high accuracy in determining whether or not the image layout of the image data matches with the image layout of the template. The present embodiment also includes classifying the image data acquired by the image scanning unit 46 into either the main body area or the note area based on the presence or absence of a frame. Therefore, the present embodiment ensures high accuracy in classifying the image data even when the text portion contains a plurality of areas with different attributes (e.g. main body area and the note area). The present embodiment also includes generating the vector data from the image data, and outputting the generated vector data in the image layout of the template with which the image layout of the image data matches, thereby allowing user to edit the file using PowerPoint. The present embodiment hence improves convenience for user.

The present embodiment also includes calculating a score showing the matching degree of the image layout between the image data and the template, and determining that the image layout of the image data matches with the image layout of the template with the highest score, thereby ensuring high accuracy in the matching check of the image layout between the image data and the template.

The present embodiment also includes displaying the selection information for allowing user to select the image layout of the template on the touch screen of the external input device 49 or the external output display 59 if the calculate scores are below a certain level. Thus, the present embodiment allows user to select the image layout of his/her desired template if the calculated scores are below a certain level.

The present embodiment also includes adding the vector data to the file "sample.pptx" in the OOXML format to generate the file "sample.pptx" in the note mode. The present embodiment also includes displaying the file "sample.pptx" in the note mode on the touch screen of the external input device 49 or the external output device 59, thereby allowing user to view the file "sample.pptx" in the note mode and to edit the "sample.pptx" via the external input device 49 or the external input device 58 using PowerPoint.

The image forming device 4 according to the present embodiment can also receive the image data created on the PC 5 via the communication device 48, instead of acquiring it by scanning a paper document with the image scanning unit 46 as illustrate above. The application software according to the present embodiment is not limited to Powerpoint in spite of the explanations set forth above. This means that various other applications (e.g. Word) can also be used for PowerPoint. Furthermore, a plurality of templates in different modes (e.g. a N-up mode template) can also be used.

Moreover, the data processing device according to the present invention can also be implemented by a dedicated hardware circuit for executing the aforementioned steps, or a program executed by the CPU to perform the aforementioned steps. If the present invention is implemented by the latter means, the control program of the data processing device can take a form of a computer readable recording medium such as a floppy (registered trademark) disk or CD-ROM, or a downloadable program file supplied on-line via a network such as Internet. In the former case, the program recorded on the computer readable recording medium is normally transmitted to a memory unit such as a ROM or a hard disk. The control program can also take a form of an application software program or a built-in function of the data processing device.

What is claimed is:

1. A data processing device for creating a file in a specified format in which a plurality of scanned data files generated by an image scanning device by reading out a document are allocated to either a plurality of pages or a plurality of sheets, the data processing device comprising:
   a reception unit for receiving user's designation of one of said plurality of pages or plurality of sheets to which each of said plurality of scanned data files is allocated before said plurality of scanned data files are generated by said image scanning device; and
   a data creating unit for creating a file in the specified format in which each of said plurality of scanned data files created by said image scanning device are allocated to said one of pages or sheets which is designated corresponding to the allocated scanned data file;
   wherein said pages or sheets are spreadsheets; and
   wherein when sheets starting with a fourth sheet in said specified format is designated as a spreadsheet in which the relevant scanned data file is allocated, said sheets starting with the fourth sheet are added.

2. The data processing device as claimed in claim 1, wherein
   said reception unit receives said user's designation of number of pieces of said plurality of scanned data files to be generated and said user's designation, before said scanned data files are generated by said image scanning device, of said one of said plurality of pages or sheets to which each of said plurality of scanned data files is allocated.

3. The data processing device as claimed in claim 1 wherein said specified format is Microsoft Excel(registered trademark).

4. The data processing device as claimed in claim 1, wherein said specified format is Microsoft Excel(registered trademark), and said plurality of pages or plurality of sheets are pages.

5. A data processing method for creating a file in a specified format in which a plurality of scanned data files generated by an image scanning device by reading out a document are allocated to either a plurality of pages or a plurality of sheets, the method comprising:
   (1) receiving user's designation of one of said plurality of pages or plurality of sheets to which each of said plurality of scanned data files is allocated before said plurality of scanned data files are generated by said image scanning device; and
   (2) creating a file in the specified format in which each of said plurality of scanned data files created by said image scanning device are allocated to said one of pages or sheets which is designated corresponding to the allocated scanned data file
   said pages or sheets are spreadsheets; and
   wherein when sheets starting with a fourth sheet in said specified format is designated as a spreadsheet in which the relevant scanned data file is allocated, said sheets starting with the fourth sheet are added.

6. The data processing method as claimed in claim 5, wherein
   user's designation of number of pieces of said plurality of scanned data files to be generated and said user's designation is received, before said scanned data is generated by said scanning device, of said one of said plurality of pages or sheets to which each of said plurality of scanned data files is allocated.

7. The data processing method as claimed in claim 5 wherein said specified format is Microsoft Excel(registered trademark).

8. The data processing method as claimed in claim 5, wherein
   said specified format is Microsoft Word(registered trademark), and said plurality of pages or plurality of sheets are pages.

9. A data processing device comprising:
   an acquisition unit for acquiring image data;
   an input unit in which selection of application software is input by a user;
   a determination unit for, by comparing said image data acquired by said acquisition unit with a plurality of templates corresponding to said application software selected by the user, automatically determining which of said plurality of templates matches with said image data; and
   a control unit for generating vector data from said image data, and controlling said data processing device so that said generated vector data is output as a file in a format corresponding to said template which corresponds to said application software selected by the user and is automatically determined by said determination unit as matching with said image data;
   wherein said plurality of templates includes at least one of first data area with its outer edge being surrounded by a frame, and second data area with its outer frame not being surrounded by a frame; and
   said determination unit classify said image data into data area corresponding to said first data area or data area corresponding to said second data area based on presence or absence of said frame within said image data.

10. The data processing device as claimed in claim 9, wherein
    said determination unit calculates a score of matching degree between said image data and a format of said template based on check result as to whether or not said image data fits into template data area of said template, and determines whether or not the format of said image data matches with the format of said template based on said calculated score.

11. The data processing device as claimed in claim 10, wherein
    said control unit controls said data processing device so that selection information for allowing user to select layout format of said template is output to an output unit if said calculated score is below a certain level.

12. The data processing device as claimed in claim 9, wherein
    said control unit appends said vector data to a file in a specified format corresponding to a specified application software selected by the user, and generates a file in a format corresponding to said template with which said determination unit determines that said template matches.

13. The data processing device as claimed in claim 9, wherein
    said application software selected by the user is one of Microsoft Word (registered trademark), Microsoft Excel (registered trademark), and Microsoft PowerPoint (registered trademark).

14. The data processing device as claimed in claim 10, wherein
    said specified format is OOXML.

15. A data processing method comprising:
    acquiring image data with an acquisition unit;
    inputting selection of application software with an input unit;
    determining with a determination unit, by comparing said image data with a plurality of templates corresponding to said application software, which of said plurality of templates matches with said image data; and
    generating, with a control unit, vector data from said acquired image data, and outputting said generated vector data as a file in a format corresponding to said template which corresponds to said application software and is determined as matching with said image data;
    wherein said plurality of templates includes at least one of first data area with its outer edge being surrounded by a frame, and second data area with its outer frame not being surrounded by a frame; and
    said determination unit classify said image data into data area corresponding to said first data area or data area corresponding to said second data area based on presence or absence of said frame within said image data.

16. The data processing device as claimed in claim 15, wherein
    said determination unit calculates a score of matching degree between a format of said image data and a format of said template based on check result as to whether or not said image data fits into template data area of said template, and determines whether or not the format of said image data matches with the format of said template based on said calculated score.

17. The data processing device as claimed in claim 16, wherein
    said control unit controls said data processing device so that selection information for allowing user to select layout format of said template is output to an output unit if said calculated score is below a certain level.

18. The data processing device as claimed in claim 16, wherein
said file to be output is OOXML.

19. The data processing device as claimed in claim 15, wherein
said control unit appends said vector data to a file in a specified format corresponding to a specified application software selected by the user, and generates a file in a format corresponding to said template with which said determination unit determines that said template matches.

20. The data processing device as claimed in claim 15, wherein
said application software selected by the user is one of Microsoft Word (registered trademark), Microsoft Excel (registered trademark), and Microsoft PowerPoint (registered trademark).

21. A data processing device comprising:
an acquisition unit for acquiring image data;
a determination unit for determining whether or not image layout of said acquired image data matches with a predefined template, by comparing said acquired image data with template data area of said template in order to determine whether or not said acquired image data fits into said template data area; and
a control unit for generating vector data from said image data, and controlling said data processing device so that said generated vector data is output in image layout of said template with which said determination unit determines that image layout of said acquired image data matches;
wherein said determination unit calculates a score of matching degree between image layout of said image data and image layout of said template based on check result as to whether or not said image data fits into said template data area, and determines whether or not image layout of said image data matches with image layout of said template based on said calculated score;
wherein said control unit controls said data processing device so that selection information for allowing user to select image layout of said template is output to an output unit if said calculated score is below a certain level.

* * * * *